(12) United States Patent
Henninger et al.

(10) Patent No.: US 7,499,881 B2
(45) Date of Patent: Mar. 3, 2009

(54) COMPENSATORY RATIO HEDGING

(75) Inventors: Mark A. Henninger, Eureka, IL (US); Pierre A. Muller, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 1855 days.

(21) Appl. No.: 09/738,618

(22) Filed: Dec. 15, 2000

(65) Prior Publication Data

US 2002/0107774 A1  Aug. 8, 2002

(51) Int. Cl.
*G06Q 40/00* (2006.01)
(52) U.S. Cl. .................. 705/36 R; 705/35; 705/37
(58) Field of Classification Search ............. 705/35, 705/36, 37, 36 R
See application file for complete search history.

(56) References Cited

U.S. PATENT DOCUMENTS 5,742,775 A * 4/1998 King
6,148,293 A * 11/2000 King ..................... 705/35
6,304,858 B1 * 10/2001 Mosler et al. ............ 705/37

OTHER PUBLICATIONS

HNG Financial Appendix 1999.*
Falkenstein, Eric and Hanweck, Jerry; "Minimizing Basis Risk from Nonparallel Shifts in the Yield Curve"; Jun. 1996.*
Interest Rate Swaps, Sep. 1999.*
Chen, Andrew; Wharton: The Market Value and Dynamic Interest Rate Risk of Swaps; Feb. 1996.*
Morgan Stanley Dean Witter: Introduction to Interest Rate Swaps, Jan. 1998.*
Investment Dealers Association of Canada-Compliance Interpretation Bulletin, May 1, 1992.*
French, Jane. "Synthetic Securities". Corporate Finance. London: May 1993. p. 41, 8 pgs.*
Falkenstein, Eric and Hanweck, Jerry. "Minimizing Basis Risk from Nonparallel Shifts in the Yield Curve". Jun. 1996.*
New Accounting Standard Gets Mixed Reviews—The Wall Street Journal Oct. 23, 2000 p. C21.

* cited by examiner

*Primary Examiner*—Lalita M. Hamilton
(74) *Attorney, Agent, or Firm*—Finnegan, Henderson, Farabow, Garrett & Dunner

(57) ABSTRACT

Compensatory ratio hedging is a methodology whereby an amount of a bond that is hedged by a swap varies during the life of the swap, per a predetermined schedule, such that the change in the swap's mark-to-market dollar value is equal to the change in the bond's market value caused by an equal change in interest rates. The amount of bond being hedged by the swap will vary over a predetermined period of time to compensate for the differences in swap and bond valuation drivers. This methodology establishes a hedge such that an interest rate change has a similar dollar impact on the swap mark-to-market value and the bond mark-to-market value thus curtailing some reporting implications of Financial Accounting Standards No. 133 of the Financial Accounting Standards Board.

17 Claims, 17 Drawing Sheets

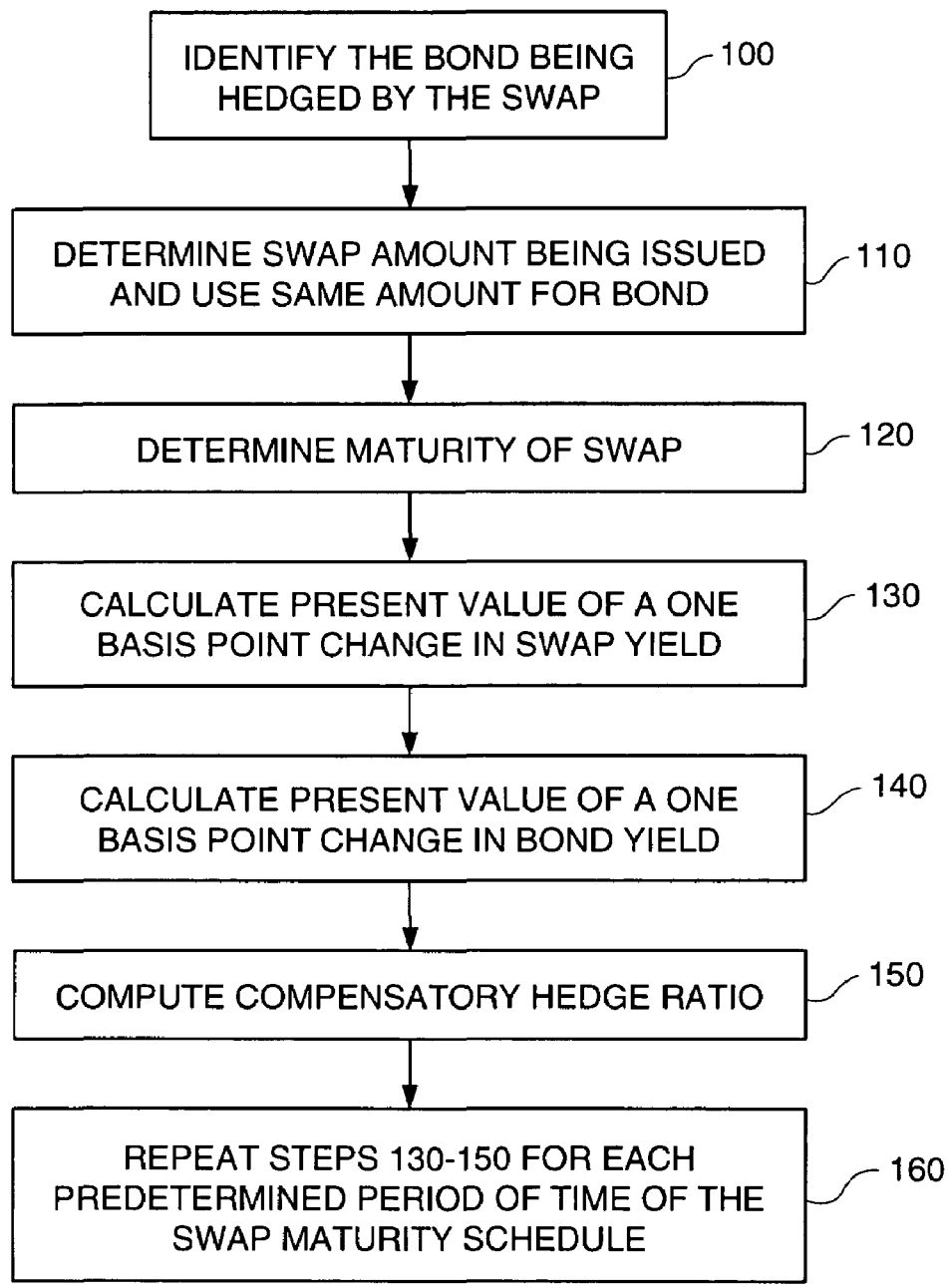

Fig. 2.

|  | VALUE OF 1 BP AT INITIAL DATE (210) | VALUE OF 1 BP WITH 12 MONTHS REMAINING (220) |
|---|---|---|
| EXHIBIT 1 | | |
| 4 Year Swap | $36,125 | $ 9,730 |
| 4 Year Bond | $36,185 | $ 9,734 |
| EXHIBIT 2 | | |
| 5 Year Swap | $46,546 | $ 9,726 |
| 7 Year Bond | $65,181 | $27,313 |
| EXHIBIT 3 | | |
| 6 Year Swap | $56,887 | $ 9,726 |
| 8 Year Bond | $64,013 | $23,052 |
| EXHIBIT 4 | | |
| 7 Year Swap | $54,921 | $ 9,653 |
| 10 Year Bond | $71,574 | $36,005 |

|  | HEDGE RATIO AT INITIAL DATE (240) | HEDGE RATIO WITH 12 MONTHS REMAINING (250) |
|---|---|---|
| EXHIBIT 1 | 99.8% ($36,125 / $36,185) | 100.0% ($9,730 / $9,734) |
| EXHIBIT 2 | 71.4% ($46,546 / $65,181) | 35.6% ($27,313 / $9,726) |
| EXHIBIT 3 | 88.9% ($56,887 / $64,013) | 42.2% ($9,726 / $23,052) |
| EXHIBIT 4 | 76.7% ($54,921 / $71,574) | 26.8% ($9,653 / $36,005) |

Fig. 3

CALCULATION OF THE COMPENSATORY HEDGE RATIO

Swap Notional $100,000,000  
Receive Rate 5.153%

Bond (nominal): $100,000,000  
Bond (coupon interest rate): 9.000%

| Date | No. of Months | PV of Profit (5.15% Initial pay rate Swap) | V of Adj. Profit (5.16% Adj. pay rate Swap) | PV of 1 BP | No. of Months | PV at Initial Bond Yield 5.710% | PV at Initial Bond Yield 5.720% | PV of 1 BP | Compensatory Hedge Ratio |
|---|---|---|---|---|---|---|---|---|---|
| 4-Jan-99 | | | | | | | | | |
| 31-Jan-99 | 48 | $0 | -$36,125 | $36,125 | 48 | $101,813,328 | $101,777,143 | $36,185 | 99.8% |
| feb | 47 | $0 | -$35,445 | $35,445 | 47 | $101,779,464 | $101,743,961 | $35,502 | 99.8% |
| mar | 46 | $0 | -$34,762 | $34,762 | 46 | $101,745,444 | $101,710,627 | $34,817 | 99.8% |
| apr | 45 | $0 | -$34,076 | $34,076 | 45 | $101,711,269 | $101,677,140 | $34,129 | 99.8% |
| may | 44 | $0 | -$33,387 | $33,387 | 44 | $101,676,937 | $101,643,499 | $33,438 | 99.8% |
| jun | 43 | $0 | -$32,695 | $32,695 | 43 | $101,642,448 | $101,609,704 | $32,744 | 99.9% |
| jul | 42 | $0 | -$32,000 | $32,000 | 42 | $101,607,801 | $101,575,754 | $32,047 | 99.9% |
| aug | 41 | $0 | -$31,303 | $31,303 | 41 | $101,572,995 | $101,541,648 | $31,347 | 99.9% |
| sep | 40 | $0 | -$30,602 | $30,602 | 40 | $101,538,030 | $101,507,385 | $30,645 | 99.9% |
| oct | 39 | $0 | -$29,898 | $29,898 | 39 | $101,502,905 | $101,472,966 | $29,939 | 99.9% |
| nov | 38 | $0 | -$29,192 | $29,192 | 38 | $101,467,619 | $101,438,389 | $29,230 | 99.9% |
| dec | 37 | $0 | -$28,482 | $28,482 | 37 | $101,432,172 | $101,403,653 | $28,519 | 99.9% |
| jan 2000 | 36 | $0 | -$27,769 | $27,769 | 36 | $101,396,562 | $101,368,757 | $27,805 | 99.9% |
| feb | 35 | $0 | -$27,054 | $27,054 | 35 | $101,360,789 | $101,333,702 | $27,087 | 99.9% |
| mar | 34 | $0 | -$26,335 | $26,335 | 34 | $101,324,853 | $101,298,486 | $26,367 | 99.9% |
| apr | 33 | $0 | -$25,613 | $25,613 | 33 | $101,288,752 | $101,263,108 | $25,643 | 99.9% |
| may | 32 | $0 | -$24,888 | $24,888 | 32 | $101,252,485 | $101,227,569 | $24,917 | 99.9% |
| jun | 31 | $0 | -$24,161 | $24,161 | 31 | $101,216,053 | $101,191,866 | $24,187 | 99.9% |
| jul | 30 | $0 | -$23,430 | $23,430 | 30 | $101,179,454 | $101,155,999 | $23,455 | 99.9% |
| aug | 29 | $0 | -$22,696 | $22,696 | 29 | $101,142,687 | $101,119,968 | $22,719 | 99.9% |
| sep | 28 | $0 | -$21,958 | $21,958 | 28 | $101,105,752 | $101,083,771 | $21,980 | 99.9% |
| oct | 27 | $0 | -$21,218 | $21,218 | 27 | $101,068,648 | $101,047,409 | $21,239 | 99.9% |
| nov | 26 | $0 | -$20,475 | $20,475 | 26 | $101,031,374 | $101,010,880 | $20,494 | 99.9% |
| dec | 25 | $0 | -$19,728 | $19,728 | 25 | $100,993,929 | $100,974,183 | $19,746 | 99.9% |
| jan 2001 | 24 | $0 | -$18,978 | $18,978 | 24 | $100,956,313 | $100,937,318 | $18,995 | 99.9% |
| feb | 23 | $0 | -$18,226 | $18,226 | 23 | $100,918,525 | $100,900,284 | $18,241 | 99.9% |
| mar | 22 | $0 | -$17,469 | $17,469 | 22 | $100,880,563 | $100,863,080 | $17,483 | 99.9% |
| apr | 21 | $0 | -$16,710 | $16,710 | 21 | $100,842,428 | $100,825,705 | $16,723 | 99.9% |
| may | 20 | $0 | -$15,948 | $15,948 | 20 | $100,804,118 | $100,788,159 | $15,959 | 99.9% |
| jun | 19 | $0 | -$15,182 | $15,182 | 19 | $100,765,633 | $100,750,441 | $15,192 | 99.9% |
| jul | 18 | $0 | -$14,413 | $14,413 | 18 | $100,726,972 | $100,712,549 | $14,422 | 99.9% |
| aug | 17 | $0 | -$13,641 | $13,641 | 17 | $100,688,133 | $100,674,484 | $13,649 | 99.9% |
| sep | 16 | $0 | -$12,865 | $12,865 | 16 | $100,649,117 | $100,636,245 | $12,873 | 99.9% |
| oct | 15 | $0 | -$12,086 | $12,086 | 15 | $100,609,922 | $100,597,829 | $12,093 | 99.9% |
| nov | 14 | $0 | -$11,304 | $11,304 | 14 | $100,570,548 | $100,559,238 | $11,310 | 99.9% |
| dec | 13 | $0 | -$10,519 | $10,519 | 13 | $100,530,994 | $100,520,470 | $10,524 | 100.0% |
| jan 2002 | 12 | $0 | -$9,730 | $9,730 | 12 | $100,491,258 | $100,481,524 | $9,734 | 100.0% |
| feb | 11 | $0 | -$8,938 | $8,938 | 11 | $100,451,341 | $100,442,399 | $8,942 | 100.0% |
| mar | 10 | $0 | -$8,142 | $8,142 | 10 | $100,411,240 | $100,403,095 | $8,146 | 100.0% |
| apr | 9 | $0 | -$7,344 | $7,344 | 9 | $100,370,956 | $100,363,610 | $7,346 | 100.0% |
| may | 8 | $0 | -$6,541 | $6,541 | 8 | $100,330,488 | $100,323,945 | $6,543 | 100.0% |
| jun | 7 | $0 | -$5,736 | $5,736 | 7 | $100,289,835 | $100,284,097 | $5,737 | 100.0% |
| jul | 6 | $0 | -$4,927 | $4,927 | 6 | $100,248,995 | $100,244,067 | $4,928 | 100.0% |
| aug | 5 | $0 | -$4,114 | $4,114 | 5 | $100,207,968 | $100,203,853 | $4,115 | 100.0% |
| sep | 4 | $0 | -$3,298 | $3,298 | 4 | $100,166,754 | $100,163,455 | $3,299 | 100.0% |
| oct | 3 | $0 | -$2,479 | $2,479 | 3 | $100,125,350 | $100,122,871 | $2,479 | 100.0% |
| nov | 2 | $0 | -$1,656 | $1,656 | 2 | $100,083,758 | $100,082,101 | $1,656 | 100.0% |
| dec | 1 | $0 | -$830 | $830 | 1 | $100,041,974 | $100,041,145 | $830 | 100.0% |
| jan 2003 | 0 | $0 | $0 | $0 | 0 | $100,000,000 | $100,000,000 | $0 | #DIV/0! |

FIG. 4.

CALCULATION OF THE CORRELATION BETWEEN SWAP AND RATIO HEDGE BOND

| | 405 | 410 | 415 | 420 | 425 | 430 | 435 | 440 | 445 | 450 |
|---|---|---|---|---|---|---|---|---|---|---|
| | Swap Notional | $100,000,000 | Hypothetical Rate | Actual month-end | Using CP at month | Settlement on | | | | |
| | Receive Rate | 6.088% | 5.085% | CP Rate | end + 18 bps | 13-feb-00 annual | Market Yield | | Adjusted MTM | Monthly Change |
| 407 | | No. of Months | (Per Counterparty) Swap MTM | | Actual floating rate | No. of days of accrued interest | (Updated) | Accrued Interest | (excl. accrued int.) | Adj. MTM |
| 4-Jan-99 | | | | | | | | $0 | $0 | |
| 31-Jan-99 | | 48 | $54,204 | | | | 5.070% | $0 | $54,204 | $54,204 |
| | | 47 | -$2,034,749 | | | | 5.666% | $0 | -$2,034,749 | -$2,088,953 |
| | | 46 | -$1,520,311 | | | | 5.526% | $0 | -$1,520,311 | $514,438 |
| apr | | 45 | -$1,729,948 | | | | 5.598% | $0 | -$1,729,948 | -$209,637 |
| | | 44 | -$3,004,878 | | | | 6.000% | $0 | -$3,004,878 | -$1,274,930 |
| | | 43 | -$3,316,377 | | | | 6.118% | $0 | -$3,316,377 | -$311,499 |
| jul | | 42 | -$4,021,892 | | | | 6.370% | $0 | -$4,021,892 | -$705,516 |
| -1,304,646 | | 41 | -$4,324,921 | 5.17% | 5.35% | 199 | 6.500% | $402,089 | -$4,324,921 | -$303,028 |
| | | 40 | -$483,623 | 5.28% | 5.46% | 229 | | $393,692 | -$877,315 | $829,420 |
| oct | | 39 | -$654,383 | 5.28% | 5.46% | 260 | | $447,342 | -$1,101,725 | -$224,411 |
| | | 38 | -$1,094,034 | 5.37% | 5.55% | 290 | | $427,055 | -$1,521,089 | -$419,363 |
| | | 37 | -$1,704,862 | 5.55% | 5.73% | 321 | | $314,404 | -$2,019,266 | -$498,177 |
| jan 2000 | | 36 | -$2,641,451 | 5.59% | 5.77% | 352 | | $306,192 | -$2,947,643 | -$928,377 |
| | | 35 | -$2,931,088 | 5.76% | 5.94% | 15 | | $6,062 | -$2,937,150 | $10,493 |
| | | 34 | -$2,916,663 | 5.93% | 6.11% | 48 | | -$2,836 | -$2,913,827 | $23,322 |
| apr | | 33 | -$3,243,567 | 6.02% | 6.20% | 76 | | -$23,425 | -$3,220,142 | -$306,315 |
| | | 32 | -$3,742,970 | 6.40% | 6.58% | 107 | | -$144,377 | -$3,598,593 | -$378,451 |
| | | 31 | -$2,808,153 | 6.53% | 6.71% | 137 | | -$233,651 | -$2,574,502 | -$1,024,091 |
| jul | | 30 | -$2,582,067 | 6.49% | 6.67% | 168 | | -$268,110 | -$2,313,957 | $260,545 |
| | | 29 | -$2,142,443 | 6.47% | 6.65% | 199 | | -$306,678 | -$1,835,765 | $478,192 |
| | | 28 | -$1,653,990 | 6.48% | 6.66% | 229 | | -$361,067 | -$1,292,923 | $542,842 |
| oct | | 27 | -$1,558,893 | 6.48% | 6.66% | 260 | | -$404,752 | -$1,154,141 | $138,782 |

455 460

Bond (nominal): $100,000,000
Bond (coupon interest rate): 6.000%

| | 465 | 470 | 475 | 480 | 485 | 490 | 495 |
|---|---|---|---|---|---|---|---|
| No. of Months | Computed Bond Value | Actual Libor Swap Yield | Constant Yield Differential | Constant Diff. Libor vs CP Swap | Effective Swap Yield | Bond Price If Yield Unchanged | Amort of Premium | Bond Value Mthly Change |
| 49 | 102.2165% | 5.1850% | 0.3090% | 0.1000% | 5.3940% | 102.216% | | |
| 48 | 102.2305% | 5.1700% | 0.3090% | 0.1000% | 5.3790% | 102.176% | 0.041% | $54,516 |
| 47 | 100.0906% | 5.7650% | 0.3090% | 0.1000% | 5.9740% | 102.135% | 0.041% | -$2,099,155 |
| 46 | 100.5631% | 5.6267% | 0.3090% | 0.1000% | 5.8357% | 102.094% | 0.041% | $513,427 |
| 45 | 100.3138% | 5.6975% | 0.3090% | 0.1000% | 5.9065% | 102.053% | 0.041% | -$208,216 |
| 44 | 98.9909% | 6.1000% | 0.3090% | 0.1000% | 6.3090% | 102.012% | 0.041% | -$1,281,692 |
| 43 | 98.6356% | 6.2183% | 0.3090% | 0.1000% | 6.4273% | 101.971% | 0.041% | -$313,783 |
| 42 | 97.8661% | 6.4700% | 0.3090% | 0.1000% | 6.6790% | 101.929% | 0.042% | -$707,924 |
| 41 | 97.5401% | 6.6000% | 0.3090% | 0.1000% | 6.8090% | 101.887% | 0.042% | -$304,141 |
| 40 | 98.2810% | 6.3667% | 0.3090% | 0.1000% | 6.5757% | 101.845% | 0.042% | $782,898 |
| 39 | 98.2088% | 6.4050% | 0.3090% | 0.1000% | 6.6140% | 101.803% | 0.042% | -$29,939 |
| 38 | 97.8370% | 6.5517% | 0.3090% | 0.1000% | 6.7607% | 101.760% | 0.042% | -$329,444 |
| 37 | 97.0326% | 6.8650% | 0.3090% | 0.1000% | 7.0740% | 101.718% | 0.043% | -$761,811 |
| 36 | 96.0365% | 7.2700% | 0.3090% | 0.1000% | 7.4790% | 101.675% | 0.043% | -$953,259 |
| 35 | 96.4051% | 7.1646% | 0.3090% | 0.1000% | 7.3736% | 101.632% | 0.043% | $411,502 |
| 34 | 96.4464% | 7.1850% | 0.3090% | 0.1000% | 7.3940% | 101.589% | 0.043% | $84,538 |
| 33 | 96.2018% | 7.3245% | 0.3090% | 0.1000% | 7.5335% | 101.546% | 0.043% | -$201,328 |
| 32 | 95.7838% | 7.5463% | 0.3090% | 0.1000% | 7.7553% | 101.502% | 0.044% | -$374,454 |
| 31 | 96.7345% | 7.1835% | 0.3090% | 0.1000% | 7.3925% | 101.458% | 0.044% | $994,454 |
| 30 | 97.0218% | 7.0980% | 0.3090% | 0.1000% | 7.3070% | 101.414% | 0.044% | $331,314 |
| 29 | 97.5728% | 6.8869% | 0.3090% | 0.1000% | 7.0959% | 101.370% | 0.044% | $595,100 |
| 28 | 98.0661% | 6.6907% | 0.3090% | 0.1000% | 6.8997% | 101.326% | 0.044% | $537,645 |
| 27 | 98.2559% | 6.6295% | 0.3090% | 0.1000% | 6.8385% | 101.281% | 0.045% | $234,395 |

FIG. 5

| | 510 | 515 | 520 | 525 | 530 | 535 | 540 | 545 | 550 |
|---|---|---|---|---|---|---|---|---|---|
| | Bond Value Mthly Change | Compensatory Hedge Ratio | Hedged Bond MTM mthly change (24*26) | averg. x Life-to-date Hedged Bond MTM mthly change | Swap MTM Mthly Change | Ineffective Portion of Swap MTM (26-27) Y minus X | Square of Total Deviation SST | Square of Unexplained Dev (neffect.portion) SSE | r2 |
| 505 → 31-Jan-99 | $54,516 | 99.8% | $54,427 | $54,427 | $54,204 | $223 | 49,628 | 49,628 | 0.0% |
| | -$2,099,155 | 99.8% | -$2,095,772 | -$1,020,673 | -$2,088,953 | -$6,819 | 2,296,582,289,735 | 46,500,279 | 100.0% |
| apr | $513,427 | 99.8% | $512,616 | -$509,577 | $514,438 | -$1,822 | 3,860,883,517,609 | 3,321,108 | 100.0% |
| | -$208,216 | 99.8% | -$207,894 | -$434,156 | -$209,637 | $1,743 | 3,927,087,283,599 | 3,038,583 | 100.0% |
| jul | -$1,281,692 | 99.9% | -$1,279,746 | -$603,274 | -$1,274,930 | -$4,816 | 4,494,871,176,593 | 23,193,636 | 100.0% |
| | -$313,783 | 99.9% | -$313,316 | -$554,948 | -$311,499 | -$1,818 | 4,564,704,923,005 | 3,303,776 | 100.0% |
| oct | -$707,924 | 99.9% | -$706,894 | -$576,654 | -$705,516 | -$1,378 | 4,584,715,078,924 | 1,898,274 | 100.0% |
| | -$304,141 | 99.9% | -$303,708 | -$542,536 | -$303,028 | -$680 | 4,649,225,115,759 | 462,382 | 100.0% |
| | $782,898 | 99.9% | $781,809 | -$395,387 | $829,420 | -$47,611 | 6,318,077,971,286 | 2,266,835,080,591 | 99.4% |
| | -$29,939 | 99.9% | -$29,898 | -$358,838 | -$224,411 | $194,512 | 6,343,567,363,562 | 37,835,080,591 | 99.2% |
| | -$329,444 | 99.9% | -$329,007 | -$356,126 | -$419,363 | $90,357 | 6,348,353,334,280 | 8,164,333,782 | 98.2% |
| | -$761,811 | 99.9% | -$760,824 | -$389,851 | -$498,177 | -$262,647 | 6,357,632,550,455 | 68,983,260,696 | 98.2% |
| jan 2000 | -$953,259 | 99.9% | -$952,054 | -$433,097 | -$928,377 | -$23,678 | 6,628,902,567,665 | 560,639,095 | 95.9% |
| | $411,502 | 99.9% | $410,995 | -$372,805 | $10,493 | $400,502 | 6,815,307,260,336 | 160,401,736,247 | 96.0% |
| | $84,538 | 99.9% | $84,437 | -$342,322 | $23,322 | $61,115 | 6,982,500,378,558 | 3,734,985,049 | 95.8% |
| apr | -$201,328 | 99.9% | -$201,093 | -$333,495 | -$306,315 | $105,222 | 6,991,419,564,006 | 11,071,702,716 | 96.7% |
| | -$374,454 | 99.9% | -$374,029 | -$335,880 | -$378,451 | $4,422 | 6,990,927,028,279 | 19,551,826 | 96.7% |
| | $994,454 | 99.9% | $993,359 | -$262,033 | -$1,024,091 | -$30,732 | 8,812,603,041,850 | 944,476,775 | 96.8% |
| jul | $331,314 | 99.9% | $330,960 | -$230,823 | $260,545 | $70,415 | 9,101,296,600,373 | 4,958,338,806 | 96.8% |
| | $595,100 | 99.9% | $594,484 | -$189,557 | $478,192 | $116,291 | 9,624,644,168,383 | 13,523,688,684 | 96.9% |
| oct | $537,645 | 99.9% | $537,106 | -$154,954 | $542,842 | -$5,736 | 10,181,381,367,533 | 32,898,234 | 96.9% |
| | $234,395 | 99.9% | $234,168 | -$137,267 | $138,782 | $95,385 | 10,287,397,397,783,867 | 9,098,368,619 | 96.9% |

CALCULATION OF THE COMPENSATORY HEDGE RATIO

Swap Notional: $100,000,000  
Receive Rate: 5.153%  
Initial pay rate: 5.15%  
Adj. pay rate: 5.16%

Bond (nominal): $100,000,000  
Bond (coupon interest rate): 9.000%

| | No. of Months | PV of Profit 5.15% Swap | V of Adj. Profit 5.16% Swap | PV of 1 BP | No. of Months | PV at Initial Bond Yield 5.710% | PV at Initial Bond Yield 5.720% | PV of 1 BP | Compensatory Hedge Ratio |
|---|---|---|---|---|---|---|---|---|---|
| 4-Jan-99 | | | | | | $119,312,749 | $119,247,568 | | |
| 31-Jan-99 | 64 | $0 | -$46,546 | $46,546 | 86 | $119,312,749 | $119,247,568 | $65,181 | 71.4% |
| feb | 63 | $0 | -$45,913 | $45,913 | 85 | $119,130,478 | $119,065,981 | $64,497 | 71.2% |
| mar | 62 | $0 | -$45,276 | $45,276 | 84 | $118,947,341 | $118,883,529 | $63,812 | 71.0% |
| apr | 61 | $0 | -$44,638 | $44,638 | 83 | $118,763,332 | $118,700,207 | $63,125 | 70.7% |
| may | 60 | $0 | -$43,996 | $43,996 | 82 | $118,578,448 | $118,516,012 | $62,436 | 70.5% |
| jun | 59 | $0 | -$43,351 | $43,351 | 81 | $118,392,683 | $118,330,938 | $61,745 | 70.2% |
| jul | 58 | $0 | -$42,704 | $42,704 | 80 | $118,206,035 | $118,144,982 | $61,053 | 69.9% |
| aug | 57 | $0 | -$42,054 | $42,054 | 79 | $118,018,499 | $117,958,140 | $60,359 | 69.7% |
| sep | 56 | $0 | -$41,401 | $41,401 | 78 | $117,830,070 | $117,770,407 | $59,663 | 69.4% |
| oct | 55 | $0 | -$40,746 | $40,746 | 77 | $117,640,745 | $117,581,779 | $58,966 | 69.1% |
| nov | 54 | $0 | -$40,088 | $40,088 | 76 | $117,450,519 | $117,392,253 | $58,266 | 68.8% |
| dec | 53 | $0 | -$39,426 | $39,426 | 75 | $117,259,388 | $117,201,822 | $57,565 | 68.5% |
| jan 2000 | 52 | $0 | -$38,762 | $38,762 | 74 | $117,067,347 | $117,010,484 | $56,863 | 68.2% |
| feb | 51 | $0 | -$38,095 | $38,095 | 73 | $116,874,392 | $116,818,234 | $56,158 | 67.8% |
| mar | 50 | $0 | -$37,426 | $37,426 | 72 | $116,680,520 | $116,625,068 | $55,452 | 67.5% |
| apr | 49 | $0 | -$36,753 | $36,753 | 71 | $116,485,724 | $116,430,981 | $54,744 | 67.1% |
| may | 48 | $0 | -$36,077 | $36,077 | 70 | $116,290,002 | $116,235,968 | $54,034 | 66.8% |
| jun | 47 | $0 | -$35,399 | $35,399 | 69 | $116,093,349 | $116,040,026 | $53,322 | 66.4% |
| jul | 46 | $0 | -$34,718 | $34,718 | 68 | $115,895,760 | $115,843,151 | $52,609 | 66.0% |
| aug | 45 | $0 | -$34,033 | $34,033 | 67 | $115,697,230 | $115,645,336 | $51,894 | 65.6% |
| sep | 44 | $0 | -$33,346 | $33,346 | 66 | $115,497,756 | $115,446,579 | $51,177 | 65.2% |
| oct | 43 | $0 | -$32,656 | $32,656 | 65 | $115,297,333 | $115,246,874 | $50,459 | 64.7% |
| nov | 42 | $0 | -$31,963 | $31,963 | 64 | $115,095,956 | $115,046,218 | $49,739 | 64.3% |
| dec | 41 | $0 | -$31,267 | $31,267 | 63 | $114,893,621 | $114,844,605 | $49,016 | 63.8% |
| jan 2001 | 40 | $0 | -$30,568 | $30,568 | 62 | $114,690,323 | $114,642,031 | $48,293 | 63.3% |
| feb | 39 | $0 | -$29,866 | $29,866 | 61 | $114,486,058 | $114,438,491 | $47,567 | 62.8% |
| mar | 38 | $0 | -$29,161 | $29,161 | 60 | $114,280,821 | $114,233,981 | $46,840 | 62.3% |
| apr | 37 | $0 | -$28,452 | $28,452 | 59 | $114,074,607 | $114,028,497 | $46,111 | 61.7% |
| may | 36 | $0 | -$27,741 | $27,741 | 58 | $113,867,412 | $113,822,032 | $45,380 | 61.1% |
| jun | 35 | $0 | -$27,027 | $27,027 | 57 | $113,659,231 | $113,614,584 | $44,647 | 60.5% |
| jul | 34 | $0 | -$26,310 | $26,310 | 56 | $113,450,060 | $113,406,147 | $43,913 | 59.9% |
| aug | 33 | $0 | -$25,589 | $25,589 | 55 | $113,239,893 | $113,196,716 | $43,177 | 59.3% |
| sep | 32 | $0 | -$24,866 | $24,866 | 54 | $113,028,726 | $112,986,287 | $42,439 | 58.6% |
| oct | 31 | $0 | -$24,139 | $24,139 | 53 | $112,816,555 | $112,774,855 | $41,699 | 57.9% |
| nov | 30 | $0 | -$23,410 | $23,410 | 52 | $112,603,373 | $112,562,415 | $40,958 | 57.2% |
| dec | 29 | $0 | -$22,677 | $22,677 | 51 | $112,389,178 | $112,348,963 | $40,215 | 56.4% |
| jan 2002 | 28 | $0 | -$21,941 | $21,941 | 50 | $112,173,963 | $112,134,493 | $39,470 | 55.6% |
| feb | 27 | $0 | -$21,202 | $21,202 | 49 | $111,957,724 | $111,919,001 | $38,723 | 54.8% |
| mar | 26 | $0 | -$20,460 | $20,460 | 48 | $111,740,456 | $111,702,481 | $37,975 | 53.9% |
| apr | 25 | $0 | -$19,714 | $19,714 | 47 | $111,522,155 | $111,484,930 | $37,225 | 53.0% |
| may | 24 | $0 | -$18,965 | $18,965 | 46 | $111,302,814 | $111,266,341 | $36,473 | 52.0% |
| jun | 23 | $0 | -$18,213 | $18,213 | 45 | $111,082,430 | $111,046,711 | $35,719 | 51.0% |
| jul | 22 | $0 | -$17,458 | $17,458 | 44 | $110,860,997 | $110,826,033 | $34,964 | 49.9% |
| aug | 21 | $0 | -$16,700 | $16,700 | 43 | $110,638,511 | $110,604,304 | $34,207 | 48.8% |
| sep | 20 | $0 | -$15,938 | $15,938 | 42 | $110,414,966 | $110,381,518 | $33,448 | 47.7% |
| oct | 19 | $0 | -$15,173 | $15,173 | 41 | $110,190,357 | $110,157,670 | $32,687 | 46.4% |
| nov | 18 | $0 | -$14,405 | $14,405 | 40 | $109,964,679 | $109,932,755 | $31,925 | 45.1% |
| dec | 17 | $0 | -$13,634 | $13,634 | 39 | $109,737,928 | $109,706,768 | $31,160 | 43.8% |
| jan 2003 | 16 | $0 | -$12,859 | $12,859 | 38 | $109,510,098 | $109,479,703 | $30,394 | 42.3% |
| feb | 15 | $0 | -$12,081 | $12,081 | 37 | $109,281,183 | $109,251,557 | $29,627 | 40.8% |
| mar | 14 | $0 | -$11,299 | $11,299 | 36 | $109,051,180 | $109,022,322 | $28,857 | 39.2% |
| apr | 13 | $0 | -$10,515 | $10,515 | 35 | $108,820,081 | $108,791,995 | $28,086 | 37.4% |
| may | 12 | $0 | -$9,726 | $9,726 | 34 | $108,587,884 | $108,560,571 | $27,313 | 35.6% |
| jun | 11 | $0 | -$8,935 | $8,935 | 33 | $108,354,581 | $108,328,043 | $26,538 | 33.7% |
| jul | 10 | $0 | -$8,140 | $8,140 | 32 | $108,120,168 | $108,094,406 | $25,762 | 31.6% |
| aug | 9 | $0 | -$7,341 | $7,341 | 31 | $107,884,640 | $107,859,656 | $24,984 | 29.4% |
| sep | 8 | $0 | -$6,540 | $6,540 | 30 | $107,647,991 | $107,623,787 | $24,204 | 27.0% |
| oct | 7 | $0 | -$5,734 | $5,734 | 29 | $107,410,216 | $107,386,794 | $23,422 | 24.5% |
| nov | 6 | $0 | -$4,926 | $4,926 | 28 | $107,171,310 | $107,148,671 | $22,639 | 21.8% |
| dec | 5 | $0 | -$4,114 | $4,114 | 27 | $106,931,267 | $106,909,413 | $21,853 | 18.8% |
| jan 2004 | 4 | $0 | -$3,298 | $3,298 | 26 | $106,690,081 | $106,669,015 | $21,067 | 15.7% |
| feb | 3 | $0 | -$2,479 | $2,479 | 25 | $106,447,748 | $106,427,470 | $20,278 | 12.2% |
| mar | 2 | $0 | -$1,656 | $1,656 | 24 | $106,204,262 | $106,184,774 | $19,487 | 8.5% |
| apr | 1 | $0 | -$830 | $830 | 23 | $105,959,617 | $105,940,922 | $18,695 | 4.4% |
| may | 0 | $0 | $0 | $0 | 22 | $105,713,808 | $105,695,907 | $17,901 | 0.0% |

CALCULATION OF THE CORRELATION BETWEEN SWAP AND RATIO HEDGE BOND

| | 705 | 710 | 715 | 720 | 725 | 730 | 735 | 740 | 745 | 750 |
|---|---|---|---|---|---|---|---|---|---|---|
| Swap Notional | $100,000,000 | Hypothetical Rate | | Actual month-end CP Rate | Using CP at month end + 18 bps | Settlement on 4-Jan | Market Yield | | Adjusted MTM | Monthly Change |
| Receive Rate | 6.330% | 5.153% | | | | 4-Dec No. of days of accrued interest | (Updated) | Accrued Interest | (excl. accrued int.) | Adj. MTM |
| 707 | No. of Months | (Per Counterparty) Swap MTM | | Actual floating rate | | | | | | |
| 4-Jan-99 | | | | | | | | $0 | $0 | |
| 31-Jan-99 | 64 | $100,130 | | | | | 5.131% | $0 | $100,130 | $100,130 |
| feb | 63 | -$2,635,277 | | | | | 5.735% | $0 | -$2,635,277 | -$2,735,407 |
| mar | 62 | -$2,246,806 | | | | | 5.655% | $0 | -$2,246,806 | $388,471 |
| apr | 61 | -$2,454,704 | | | | | 5.710% | $0 | -$2,454,704 | -$207,898 |
| may | 60 | -$4,133,168 | | | | | 6.114% | $0 | -$4,133,168 | -$1,678,464 |
| jun | 59 | -$4,676,571 | | | | | 6.260% | $0 | -$4,676,571 | -$543,403 |
| jul | 58 | -$5,616,308 | | | | | 6.510% | $0 | -$5,616,308 | -$939,737 |
| aug | 57 | -$5,671,792 | | | | | 6.545% | $0 | -$5,671,792 | -$55,484 |
| sep | 56 | -$5,079,937 | 5.29% | 5.47% | 118 | | 6.415% | $279,579 | -$5,079,937 | $591,855 |
| oct | 55 | -$376,000 | 5.28% | 5.46% | 149 | | 6.426% | $355,069 | -$731,069 | $1,510 |
| nov | 54 | -$883,000 | 5.36% | 5.54% | 179 | | 6.539% | $387,327 | -$1,270,327 | -$539,258 |
| dec | 53 | -$2,220,000 | 6.01% | 6.19% | 27 | | | $10,553 | -$2,230,553 | -$960,226 |
| jan 2000 | 52 | -$3,485,000 | 5.59% | 5.77% | 58 | Hypothetical Market Yield. | | $88,319 | -$3,573,319 | -$1,342,766 |
| feb | 51 | -$2,978,000 | 5.76% | 5.94% | 86 | Source: Historical Yield curve) - adjusted for the | | $92,315 | -$3,070,315 | $503,004 |
| mar | 50 | -$2,758,000 | 5.93% | 6.11% | 117 | no. of months. | | $70,735 | -$2,828,735 | $241,579 |
| apr | 49 | -$3,243,000 | 6.02% | 6.20% | 147 | ie. 3yr + 5 months. | | $52,477 | -$3,295,477 | -$466,742 |
| may | 48 | -$3,911,000 | 6.40% | 6.58% | 178 | Substract 10 bp - diff. between Libor & CP. | | -$121,796 | -$3,789,204 | -$493,727 |
| jun | 47 | -$2,685,000 | 6.53% | 6.71% | 26 | | | -$27,342 | -$2,657,658 | $1,131,546 |
| jul | 46 | -$2,458,000 | 6.49% | 6.67% | 57 | | | -$53,127 | -$2,404,873 | $252,785 |
| aug | 45 | -$2,151,000 | 6.47% | 6.65% | 88 | | | -$78,351 | -$2,072,649 | $332,224 |
| sep | 44 | -$1,105,000 | 6.48% | 6.66% | 118 | | | -$107,719 | -$997,281 | $1,075,368 |
| oct | 43 | -$1,010,000 | 6.48% | 6.66% | 149 | | | -$133,043 | -$876,957 | $120,323 |

Bond (nominal): 755 760 $100,000,000 765
Bond (coupon interest rate): 9.000%

| No. of Months | Computed Bond Value | Actual Libor Swap Yield | 770 Constant Yield Differential | 775 Constant Diff. Libor vs CP Swap | 780 Effective Swap Yield | 785 Bond Price If Yield Unchanged | 790 Amort of Premium | 795 Bond Value Mthly Change |
|---|---|---|---|---|---|---|---|---|
| 87 | 120.155% | 5.3092% | 0.4008% | 0.1000% | 5.6100% | 120.155% | | |
| 86 | 120.060% | 5.2950% | 0.4008% | 0.1000% | 5.5958% | 119.967% | 0.188% | $93,236 |
| 85 | 115.934% | 5.9128% | 0.4008% | 0.1000% | 6.2136% | 119.778% | 0.189% | -$3,937,361 |
| 84 | 116.111% | 5.8600% | 0.4008% | 0.1000% | 6.1608% | 119.588% | 0.190% | $367,259 |
| 83 | 115.620% | 5.9150% | 0.4008% | 0.1000% | 6.2158% | 119.397% | 0.191% | -$299,915 |
| 82 | 113.157% | 6.3017% | 0.4008% | 0.1000% | 6.6025% | 119.205% | 0.192% | -$2,271,255 |
| 81 | 112.080% | 6.4650% | 0.4008% | 0.1000% | 6.7658% | 119.012% | 0.193% | -$884,397 |
| 80 | 110.466% | 6.7283% | 0.4008% | 0.1000% | 7.0291% | 118.819% | 0.194% | -$1,420,017 |
| 79 | 109.710% | 6.8458% | 0.4008% | 0.1000% | 7.1466% | 118.624% | 0.195% | -$561,230 |
| 78 | 110.679% | 6.6525% | 0.4008% | 0.1000% | 6.9533% | 118.429% | 0.195% | $1,163,790 |
| 77 | 110.870% | 6.5979% | 0.4008% | 0.1000% | 6.8987% | 118.232% | 0.196% | $387,414 |
| 76 | 110.132% | 6.7133% | 0.4008% | 0.1000% | 7.0141% | 118.035% | 0.197% | -$540,793 |
| 75 | 108.454% | 7.0100% | 0.4008% | 0.1000% | 7.3108% | 117.837% | 0.198% | -$1,479,432 |
| 74 | 106.216% | 7.4288% | 0.4008% | 0.1000% | 7.7296% | 117.638% | 0.199% | -$2,039,216 |
| 73 | 106.661% | 7.3272% | 0.4008% | 0.1000% | 7.6280% | 117.438% | 0.200% | $645,187 |
| 72 | 107.113% | 7.2225% | 0.4008% | 0.1000% | 7.5233% | 117.237% | 0.201% | $652,614 |
| 71 | 106.369% | 7.3571% | 0.4008% | 0.1000% | 7.6579% | 117.035% | 0.202% | -$541,433 |
| 70 | 105.098% | 7.6054% | 0.4008% | 0.1000% | 7.9062% | 116.832% | 0.203% | -$1,068,100 |
| 69 | 106.953% | 7.2065% | 0.4008% | 0.1000% | 7.5073% | 116.628% | 0.204% | $2,058,742 |
| 68 | 107.079% | 7.1633% | 0.4008% | 0.1000% | 7.4641% | 116.423% | 0.205% | $330,892 |
| 67 | 108.160% | 6.9190% | 0.4008% | 0.1000% | 7.2198% | 116.218% | 0.206% | $1,286,669 |
| 66 | 108.791% | 6.7655% | 0.4008% | 0.1000% | 7.0663% | 116.011% | 0.207% | $837,482 |
| 65 | 108.808% | 6.7388% | 0.4008% | 0.1000% | 7.0396% | 115.803% | 0.208% | $224,176 |

Fig-8

| | 810 | 815 | 820 | 825 | 830 | 835 | 840 | 845 | 850 |
|---|---|---|---|---|---|---|---|---|---|
| 805 | Bond Value Mthly Change | Compensatory Hedge Ratio | Hedged Bond MTM mthly change (24*25) | averg. x Life-to-date Hedged Bond MTM mthly change | Y Swap MTM Mthly Change | Ineffective Portion of Swap MTM (26-27) Y minus X | Square of Total Deviation SST | Square of Unexplained Dev (ineffect.portion) SSE | r2 |
| 31-Jan-99 | $93,236 | 71.4% | $66,581 | $66,581 | $100,130 | -$33,548 | 1,125,500,380 | 1,125,500,380 | 0.0% |
| feb | -$3,937,361 | 71.2% | -$2,802,841 | -$1,368,130 | -$2,735,407 | -$67,434 | 4,025,232,445,753 | 4,547,326,165 | 99.9% |
| mar | $367,259 | 71.0% | $260,582 | -$825,226 | $388,471 | -$127,889 | 5,978,134,380,942 | 16,355,526,950 | 99.6% |
| apr | -$299,915 | 70.7% | -$212,080 | -$671,939 | -$207,898 | -$4,182 | 6,193,793,295,468 | 17,487,243 | 99.6% |
| may | -$2,271,255 | 70.5% | -$1,600,458 | -$857,643 | -$1,678,464 | $78,006 | 7,092,041,292,889 | 6,085,001,860 | 99.6% |
| jun | -$884,397 | 70.2% | -$620,936 | -$818,192 | -$543,403 | -$77,533 | 7,163,098,675,738 | 6,011,434,058 | 99.5% |
| jul | -$1,420,017 | 69.9% | -$993,248 | -$843,200 | -$939,737 | -$53,511 | 7,187,803,185,810 | 2,863,479,409 | 99.5% |
| aug | -$561,230 | 69.7% | -$391,029 | -$786,679 | -$55,484 | -$335,546 | 7,712,471,054,324 | 112,590,834,588 | 98.1% |
| sep | $1,163,790 | 69.4% | $807,578 | -$609,539 | $591,855 | $215,723 | 9,186,612,967,291 | 46,536,465,790 | 97.9% |
| oct | $387,414 | 69.1% | $267,708 | -$521,814 | $1,510 | $266,198 | 9,458,524,677,896 | 70,861,235,761 | 97.2% |
| nov | -$540,793 | 68.8% | -$372,069 | -$508,201 | -$539,258 | $167,189 | 9,457,538,409,593 | 27,952,112,745 | 96.9% |
| dec | -$1,479,432 | 68.5% | -$1,013,259 | -$550,289 | -$960,226 | -$53,033 | 9,642,759,864,005 | 2,812,482,288 | 96.9% |
| jan 2000 | -$2,039,216 | 68.2% | -$1,390,101 | -$614,890 | -$1,342,766 | -$47,335 | 10,225,944,833,831 | 2,240,612,832 | 97.1% |
| feb | $645,187 | 67.8% | $437,669 | -$539,707 | $503,004 | -$65,335 | 11,375,713,533,491 | 4,268,673,797 | 97.3% |
| mar | $652,614 | 67.5% | $440,464 | -$474,363 | $241,579 | $198,885 | 11,930,000,027,966 | 39,555,135,360 | 97.1% |
| apr | -$541,433 | 67.1% | -$363,499 | -$467,434 | -$466,742 | $103,243 | 11,931,561,210,070 | 10,659,017,636 | 97.0% |
| may | -$1,068,100 | 66.8% | -$713,151 | -$481,888 | -$493,727 | -$219,423 | 11,930,306,132,838 | 48,146,632,916 | 96.8% |
| jun | $2,058,742 | 66.4% | $1,366,732 | -$379,186 | $1,131,546 | $235,186 | 14,380,521,583,999 | 55,312,409,466 | 96.6% |
| jul | $330,892 | 66.0% | $218,361 | -$347,737 | $252,785 | -$34,424 | 14,770,252,110,514 | 1,185,000,888 | 96.9% |
| aug | $1,286,669 | 65.6% | $843,829 | -$288,158 | $332,224 | $511,605 | 15,239,874,204,598 | 261,739,328,750 | 95.3% |
| sep | $837,482 | 65.2% | $545,688 | -$248,451 | $1,075,368 | -$529,680 | 17,076,067,269,470 | 280,561,006,573 | 94.1% |
| oct | $224,176 | 64.7% | $145,083 | -$230,563 | $120,323 | $24,759 | 17,210,457,519,916 | 613,024,982 | 94.2% |

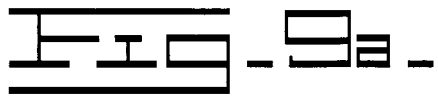

CALCULATION OF THE COMPENSATORY HEDGE RATIO

Swap Notional $100,000,000  
Receive Rate 5.165%  
Bond (nominal): $100,000,000  
Bond (coupon interest rate): 6.000%

| | No. of Months | PV of Profit (Initial pay rate 5.165% Swap) | V of Adj. Profit (Adj. pay rate 5.175% Swap) | PV of 1 BP | No. of Months | PV at Initial Bond Yield 6.185% | PV at Initial Bond Yield 6.195% | PV of 1 BP | Compensatory Hedge Ratio |
|---|---|---|---|---|---|---|---|---|---|
| 4-Jan-99 | | | | | | $98,806,923 | $98,742,910 | | |
| 31-Jan-99 | 81 | $0 | -$56,887 | $56,887 | 99 | $98,806,923 | $98,742,910 | $64,013 | 88.9% |
| feb | 80 | $0 | -$56,299 | $56,299 | 98 | $98,816,190 | $98,752,670 | $63,520 | 88.6% |
| mar | 79 | $0 | -$55,708 | $55,708 | 97 | $98,825,505 | $98,762,480 | $63,025 | 88.4% |
| apr | 78 | $0 | -$55,114 | $55,114 | 96 | $98,834,868 | $98,772,342 | $62,526 | 88.1% |
| may | 77 | $0 | -$54,518 | $54,518 | 95 | $98,844,280 | $98,782,254 | $62,026 | 87.9% |
| jun | 76 | $0 | -$53,919 | $53,919 | 94 | $98,853,740 | $98,792,217 | $61,522 | 87.6% |
| jul | 75 | $0 | -$53,318 | $53,318 | 93 | $98,863,248 | $98,802,232 | $61,016 | 87.4% |
| aug | 74 | $0 | -$52,714 | $52,714 | 92 | $98,872,806 | $98,812,299 | $60,507 | 87.1% |
| sep | 73 | $0 | -$52,108 | $52,108 | 91 | $98,882,413 | $98,822,417 | $59,995 | 86.9% |
| oct | 72 | $0 | -$51,499 | $51,499 | 90 | $98,892,069 | $98,832,588 | $59,481 | 86.6% |
| nov | 71 | $0 | -$50,887 | $50,887 | 89 | $98,901,775 | $98,842,811 | $58,964 | 86.3% |
| dec | 70 | $0 | -$50,273 | $50,273 | 88 | $98,911,532 | $98,853,087 | $58,444 | 86.0% |
| jan 2000 | 69 | $0 | -$49,656 | $49,656 | 87 | $98,921,338 | $98,863,416 | $57,922 | 85.7% |
| feb | 68 | $0 | -$49,036 | $49,036 | 86 | $98,931,195 | $98,873,799 | $57,397 | 85.4% |
| mar | 67 | $0 | -$48,414 | $48,414 | 85 | $98,941,103 | $98,884,235 | $56,868 | 85.1% |
| apr | 66 | $0 | -$47,789 | $47,789 | 84 | $98,951,062 | $98,894,725 | $56,337 | 84.8% |
| may | 65 | $0 | -$47,161 | $47,161 | 83 | $98,961,072 | $98,905,269 | $55,804 | 84.5% |
| jun | 64 | $0 | -$46,531 | $46,531 | 82 | $98,971,134 | $98,915,867 | $55,267 | 84.2% |
| jul | 63 | $0 | -$45,898 | $45,898 | 81 | $98,981,248 | $98,926,520 | $54,728 | 83.9% |
| aug | 62 | $0 | -$45,262 | $45,262 | 80 | $98,991,414 | $98,937,228 | $54,185 | 83.5% |
| sep | 61 | $0 | -$44,624 | $44,624 | 79 | $99,001,632 | $98,947,992 | $53,640 | 83.2% |
| oct | 60 | $0 | -$43,983 | $43,983 | 78 | $99,011,903 | $98,958,811 | $53,092 | 82.8% |
| nov | 59 | $0 | -$43,338 | $43,338 | 77 | $99,022,227 | $98,969,686 | $52,541 | 82.5% |
| dec | 58 | $0 | -$42,692 | $42,692 | 76 | $99,032,604 | $98,980,617 | $51,987 | 82.1% |
| jan 2001 | 57 | $0 | -$42,042 | $42,042 | 75 | $99,043,034 | $98,991,604 | $51,430 | 81.7% |
| feb | 56 | $0 | -$41,390 | $41,390 | 74 | $99,053,519 | $99,002,648 | $50,870 | 81.4% |
| mar | 55 | $0 | -$40,735 | $40,735 | 73 | $99,064,057 | $99,013,749 | $50,308 | 81.0% |
| apr | 54 | $0 | -$40,077 | $40,077 | 72 | $99,074,650 | $99,024,908 | $49,742 | 80.6% |
| may | 53 | $0 | -$39,416 | $39,416 | 71 | $99,085,297 | $99,036,124 | $49,173 | 80.2% |
| jun | 52 | $0 | -$38,752 | $38,752 | 70 | $99,095,999 | $99,047,398 | $48,601 | 79.7% |
| jul | 51 | $0 | -$38,085 | $38,085 | 69 | $99,106,756 | $99,058,730 | $48,026 | 79.3% |
| aug | 50 | $0 | -$37,416 | $37,416 | 68 | $99,117,569 | $99,070,121 | $47,448 | 78.9% |
| sep | 49 | $0 | -$36,744 | $36,744 | 67 | $99,128,438 | $99,081,570 | $46,867 | 78.4% |
| oct | 48 | $0 | -$36,069 | $36,069 | 66 | $99,139,362 | $99,093,079 | $46,283 | 77.9% |
| nov | 47 | $0 | -$35,391 | $35,391 | 65 | $99,150,343 | $99,104,647 | $45,696 | 77.4% |
| dec | 46 | $0 | -$34,710 | $34,710 | 64 | $99,161,380 | $99,116,275 | $45,105 | 77.0% |
| jan 2002 | 45 | $0 | -$34,026 | $34,026 | 63 | $99,172,474 | $99,127,962 | $44,512 | 76.4% |
| feb | 44 | $0 | -$33,339 | $33,339 | 62 | $99,183,626 | $99,139,711 | $43,915 | 75.9% |
| mar | 43 | $0 | -$32,649 | $32,649 | 61 | $99,194,835 | $99,151,519 | $43,316 | 75.4% |
| apr | 42 | $0 | -$31,956 | $31,956 | 60 | $99,206,102 | $99,163,389 | $42,713 | 74.8% |
| may | 41 | $0 | -$31,260 | $31,260 | 59 | $99,217,426 | $99,175,320 | $42,106 | 74.2% |
| jun | 40 | $0 | -$30,561 | $30,561 | 58 | $99,228,810 | $99,187,313 | $41,497 | 73.6% |
| jul | 39 | $0 | -$29,860 | $29,860 | 57 | $99,240,251 | $99,199,367 | $40,884 | 73.0% |
| aug | 38 | $0 | -$29,155 | $29,155 | 56 | $99,251,752 | $99,211,484 | $40,268 | 72.4% |
| sep | 37 | $0 | -$28,447 | $28,447 | 55 | $99,263,312 | $99,223,663 | $39,649 | 71.7% |
| oct | 36 | $0 | -$27,736 | $27,736 | 54 | $99,274,932 | $99,235,905 | $39,027 | 71.1% |
| nov | 35 | $0 | -$27,022 | $27,022 | 53 | $99,286,611 | $99,248,211 | $38,401 | 70.4% |
| dec | 34 | $0 | -$26,305 | $26,305 | 52 | $99,298,351 | $99,260,580 | $37,772 | 69.6% |
| jan | 33 | $0 | -$25,585 | $25,585 | 51 | $99,310,151 | $99,273,012 | $37,139 | 68.9% |
| feb | 32 | $0 | -$24,862 | $24,862 | 50 | $99,322,012 | $99,285,509 | $36,503 | 68.1% |
| mar | 31 | $0 | -$24,136 | $24,136 | 49 | $99,333,935 | $99,298,071 | $35,864 | 67.3% |
| apr | 30 | $0 | -$23,406 | $23,406 | 48 | $99,345,918 | $99,310,697 | $35,221 | 66.5% |
| may | 29 | $0 | -$22,673 | $22,673 | 47 | $99,357,964 | $99,323,388 | $34,575 | 65.6% |
| jun | 28 | $0 | -$21,938 | $21,938 | 46 | $99,370,071 | $99,336,145 | $33,926 | 64.7% |
| jul | 27 | $0 | -$21,199 | $21,199 | 45 | $99,382,241 | $99,348,968 | $33,273 | 63.7% |
| aug | 26 | $0 | -$20,457 | $20,457 | 44 | $99,394,474 | $99,361,857 | $32,616 | 62.7% |
| sep | 25 | $0 | -$19,711 | $19,711 | 43 | $99,406,769 | $99,374,813 | $31,957 | 61.7% |
| oct | 24 | $0 | -$18,963 | $18,963 | 42 | $99,419,129 | $99,387,835 | $31,293 | 60.6% |
| nov | 23 | $0 | -$18,211 | $18,211 | 41 | $99,431,551 | $99,400,925 | $30,626 | 59.5% |

| | 930 | 935 | 940 | 945 | 950 | 955 | 960 | 965 | 970 | 975 |
|---|---|---|---|---|---|---|---|---|---|---|
| | dec | 22 | $0 | -$17,456 | $17,456 | 40 | $99,444,038 | $99,414,082 | $29,956 | 58.3% |
| | jan | 21 | $0 | -$16,698 | $16,698 | 39 | $99,456,589 | $99,427,308 | $29,282 | 57.0% |
| | feb | 20 | $0 | -$15,937 | $15,937 | 38 | $99,469,205 | $99,440,601 | $28,604 | 55.7% |
| | mar | 19 | $0 | -$15,172 | $15,172 | 37 | $99,481,886 | $99,453,963 | $27,923 | 54.3% |
| | apr | 18 | $0 | -$14,404 | $14,404 | 36 | $99,494,632 | $99,467,394 | $27,238 | 52.9% |
| | may | 17 | $0 | -$13,633 | $13,633 | 35 | $99,507,444 | $99,480,895 | $26,549 | 51.3% |
| | jun | 16 | $0 | -$12,858 | $12,858 | 34 | $99,520,322 | $99,494,465 | $25,857 | 49.7% |
| | jul | 15 | $0 | -$12,080 | $12,080 | 33 | $99,533,266 | $99,508,105 | $25,161 | 48.0% |
| | aug | 14 | $0 | -$11,299 | $11,299 | 32 | $99,546,277 | $99,521,816 | $24,462 | 46.2% |
| | sep | 13 | $0 | -$10,514 | $10,514 | 31 | $99,559,355 | $99,535,597 | $23,759 | 44.3% |
| | oct | 12 | $0 | -$9,726 | $9,726 | 30 | $99,572,501 | $99,549,449 | $23,052 | 42.2% |
| | nov | 11 | $0 | -$8,934 | $8,934 | 29 | $99,585,714 | $99,563,373 | $22,341 | 40.0% |
| | dec | 10 | $0 | -$8,139 | $8,139 | 28 | $99,598,996 | $99,577,369 | $21,626 | 37.6% |
| | jan | 9 | $0 | -$7,341 | $7,341 | 27 | $99,612,345 | $99,591,438 | $20,908 | 35.1% |
| | feb | 8 | $0 | -$6,539 | $6,539 | 26 | $99,625,764 | $99,605,578 | $20,186 | 32.4% |
| | mar | 7 | $0 | -$5,734 | $5,734 | 25 | $99,639,252 | $99,619,792 | $19,460 | 29.5% |
| | apr | 6 | $0 | -$4,926 | $4,926 | 24 | $99,652,809 | $99,634,079 | $18,730 | 26.3% |
| | may | 5 | $0 | -$4,113 | $4,113 | 23 | $99,666,436 | $99,648,440 | $17,996 | 22.9% |
| | jun | 4 | $0 | -$3,298 | $3,298 | 22 | $99,680,134 | $99,662,875 | $17,258 | 19.1% |
| | jul | 3 | $0 | -$2,479 | $2,479 | 21 | $99,693,902 | $99,677,385 | $16,517 | 15.0% |
| | aug | 2 | $0 | -$1,656 | $1,656 | 20 | $99,707,741 | $99,691,969 | $15,771 | 10.5% |
| | sep | 1 | $0 | -$830 | $830 | 19 | $99,721,651 | $99,706,629 | $15,022 | 5.5% |
| | oct | 0 | $0 | -$0 | $0 | 18 | $99,735,633 | $99,721,365 | $14,268 | 0.0% |

CALCULATION OF THE CORRELATION BETWEEN SWAP AND RATIO HEDGE BOND

| | 1005 | 1010 | 1015 | 1020 | 1025 | 1030 | 1035 | 1040 | 1045 | 1050 |
|---|---|---|---|---|---|---|---|---|---|---|
| Swap Notional | $100,000,000 | Hypothetical Rate | 5.165% | Actual month-end CP Rate | Using CP at month end + 18 bps | Settlement on 1/3/00 annual | Market Yield | | Adjusted MTM | Monthly Change |
| Receive Rate | 5.480% | | | | | | | | | |
| 1007 | No. of Months | (Per Counterparty) Swap MTM | | | Actual floating rate | No. of days of accrued interest | (Updated) | Accrued Interest | (excl. accrued int.) | Adj. MTM |
| 4-Jan-99 | | | | | | | | $0 | $0 | |
| 31-Jan-99 | 81 | -$68,239 | | | | 5+21 | 5.177% | $0 | -$68,239 | -$68,239 |
| | 80 | -$3,476,946 | | | | 5+20 | 5.795% | $0 | -$3,476,946 | -$3,408,708 |
| | 79 | -$3,119,318 | | | | 5+19 | 5.735% | $0 | -$3,119,318 | $357,629 |
| apr | 78 | -$3,378,848 | | | | 5+18 | 5.790% | $0 | -$3,378,848 | -$259,530 |
| | 77 | -$5,369,450 | | | | 5+17 | 6.181% | $0 | -$5,369,450 | -$1,990,602 |
| | 76 | -$6,115,915 | | | | 5+16 | 6.340% | $0 | -$6,115,915 | -$746,465 |
| jul | 75 | -$7,332,810 | | | | 5+15 | 6.600% | $0 | -$7,332,810 | -$1,216,895 |
| | 74 | -$7,688,394 | | | | 5+14 | 6.690% | $0 | -$7,688,394 | -$355,584 |
| | 73 | -$6,795,503 | | | | 5+13 | 6.521% | $0 | -$6,795,503 | $892,891 |
| oct | 72 | -$6,498,778 | | | | 5+12 | 6.475% | $0 | -$6,498,778 | $296,725 |
| | 71 | -$6,994,406 | | | | 5+11 | 6.596% | $0 | -$6,994,406 | -$495,628 |
| | 70 | -$8,280,526 | | | | 5+10 | 6.893% | $0 | -$8,280,526 | -$1,286,120 |
| jan 2000 | 69 | -$10,080,361 | | | | 5+9 | 7.318% | $0 | -$10,080,361 | -$1,799,835 |
| -3,778,921 | 68 | -$4,043,515 | 5.76% | 5.94% | 16 | | | $23,671 | -$4,067,186 | -$288,265 |
| | 67 | -$3,590,935 | 5.93% | 6.11% | 47 | | | $47,644 | -$3,638,579 | $428,607 |
| apr | 66 | -$4,179,106 | 6.02% | 6.20% | 77 | | | $59,068 | -$4,238,174 | -$599,596 |
| | 65 | -$5,030,638 | 6.40% | 6.58% | 108 | Hypothetical Market Yield. Source: Historical Yield curve) - adjusted for the no. of months. ie. 3yr + 5 months. Substract 10 bp - diff. between Libor & CP. | | -$29,589 | -$5,001,049 | -$762,874 |
| | 64 | -$3,302,205 | 6.53% | 6.71% | 138 | | | -$86,959 | -$3,215,246 | $1,785,803 |
| jul | 63 | -$3,120,536 | 6.49% | 6.67% | 169 | | | -$87,973 | -$3,032,563 | $182,683 |
| | 62 | -$2,144,735 | 6.47% | 6.65% | 200 | | | -$93,151 | -$2,051,584 | $980,979 |
| | 61 | -$1,446,734 | 6.48% | 6.66% | 230 | | | -$115,315 | -$1,331,419 | $720,165 |
| oct | 60 | -$1,381,003 | 6.48% | 6.66% | 261 | | | -$125,645 | -$1,255,358 | $76,061 |

1055  1060

Bond (nominal): $100,000,000  1065
Bond (coupon interest rate): 6.000%

| | | | 1070 | 1075 | 1080 | 1085 | 1090 | 1095 |
|---|---|---|---|---|---|---|---|---|
| No. of Months | Computed Bond Value | Actual Libor Swap Yield | Constant Yield Differential | Constant Diff. Libor vs CP Swap | Effective Swap Yield | Bond Price If Yield Unchanged | Amort of Premium | Bond Value Mthly Change |
| 100 | 99.4455% | 5.3500% | 0.8350% | 0.1000% | 6.0850% | 99.445% | | $129,152 |
| 99 | 99.5789% | 5.3300% | 0.8350% | 0.1000% | 6.0650% | 99.450% | -0.004% | -$3,885,065 |
| 98 | 95.6981% | 5.9500% | 0.8350% | 0.1000% | 6.6850% | 99.454% | -0.004% | $272,117 |
| 97 | 95.9746% | 5.9100% | 0.8350% | 0.1000% | 6.6450% | 99.458% | -0.004% | -$274,603 |
| 96 | 95.7043% | 5.9600% | 0.8350% | 0.1000% | 6.6950% | 99.463% | -0.004% | -$2,210,463 |
| 95 | 93.4982% | 6.3400% | 0.8350% | 0.1000% | 7.0750% | 99.467% | -0.004% | -$984,940 |
| 94 | 92.5176% | 6.5200% | 0.8350% | 0.1000% | 7.2550% | 99.471% | -0.004% | -$1,456,525 |
| 93 | 91.0655% | 6.7900% | 0.8350% | 0.1000% | 7.5250% | 99.476% | -0.004% | -$699,973 |
| 92 | 90.3700% | 6.9300% | 0.8350% | 0.1000% | 7.6650% | 99.480% | -0.004% | $1,216,906 |
| 91 | 91.5913% | 6.7200% | 0.8350% | 0.1000% | 7.4550% | 99.485% | -0.004% | $446,704 |
| 90 | 92.0425% | 6.6500% | 0.8350% | 0.1000% | 7.3850% | 99.489% | -0.004% | -$586,935 |
| 89 | 91.4600% | 6.7700% | 0.8350% | 0.1000% | 7.5050% | 99.494% | -0.004% | -$1,414,252 |
| 88 | 90.0503% | 7.0500% | 0.8350% | 0.1000% | 7.7850% | 99.498% | -0.005% | -$1,972,825 |
| 87 | 88.0820% | 7.4500% | 0.8350% | 0.1000% | 8.1850% | 99.503% | -0.005% | $600,266 |
| 86 | 88.6868% | 7.3500% | 0.8350% | 0.1000% | 8.0850% | 99.507% | -0.005% | $697,408 |
| 85 | 89.3888% | 7.2300% | 0.8350% | 0.1000% | 7.9650% | 99.512% | -0.005% | -$560,644 |
| 84 | 88.8328% | 7.3600% | 0.8350% | 0.1000% | 8.0950% | 99.516% | -0.005% | -$1,128,849 |
| 83 | 87.7086% | 7.6100% | 0.8350% | 0.1000% | 8.3450% | 99.521% | -0.005% | $2,056,146 |
| 82 | 89.7694% | 7.2100% | 0.8350% | 0.1000% | 7.9450% | 99.526% | -0.005% | $187,682 |
| 81 | 89.9617% | 7.1900% | 0.8350% | 0.1000% | 7.9250% | 99.530% | -0.005% | $1,363,626 |
| 80 | 91.3301% | 6.9300% | 0.8350% | 0.1000% | 7.6650% | 99.535% | -0.005% | $717,703 |
| 79 | 92.0525% | 6.8000% | 0.8350% | 0.1000% | 7.5350% | 99.540% | -0.005% | $198,052 |
| 78 | 92.2553% | 6.7745% | 0.8350% | 0.1000% | 7.5095% | 99.545% | -0.005% | |

| 1105 | 1110 Bond Value Mthly Change | 1115 Compensatory Hedge Ratio | 1120 X Hedged Bond MTM mthly change (24-25) | 1125 averg. x Life-to-date Hedged Bond MTM mthly change | 1130 Y Swap MTM Mthly Change | 1135 Ineffective Portion of Swap MTM (35-27) Y minus X | 1140 Square of Total Deviation SST | 1145 Square of Unexplained Dev (Ineffect.portion) SSE | 1150 r² |
|---|---|---|---|---|---|---|---|---|---|
| 31-Jan-99 | $129,152.26 | 88.9% | $114,775 | $114,775 | -$68,239 | $183,014 | 33,494,082,217 | 33,494,082,217 | 0.0% |
|  | -$3,885,065.11 | 88.6% | -$3,443,390 | -$1,664,307 | -$3,408,708 | -$34,682 | 5,590,368,511,544 | 1,202,825,675 | 99.4% |
|  | -$272,116.63 | 88.4% | -$240,525 | -$1,029,363 | $357,629 | -$117,103 | 8,508,787,459,252 | 13,713,151,144 | 99.4% |
| apr | -$274,603.02 | 88.1% | -$242,050 | -$832,535 | -$259,530 | $17,480 | 8,965,638,921,354 | 305,550,649 | 99.5% |
|  | -$2,210,462.81 | 87.9% | -$1,942,913 | -$1,054,610 | -$1,990,602 | $47,689 | 10,017,355,557,819 | 2,274,239,706 | 99.5% |
|  | -$984,940.21 | 87.6% | -$863,226 | -$1,022,713 | -$746,465 | -$116,760 | 10,104,905,247,299 | 13,632,971,273 | 99.4% |
| jul | -$1,456,525.10 | 87.4% | -$1,272,771 | -$1,058,456 | -$1,216,895 | -$55,876 | 10,139,126,053,220 | 3,122,163,284 | 99.3% |
|  | -$699,972.65 | 87.1% | -$609,823 | -$1,002,359 | -$355,584 | -$254,239 | 10,570,905,440,040 | 64,637,569,666 | 98.7% |
|  | $1,216,905.70 | 86.9% | $1,056,920 | -$773,550 | $892,891 | $164,029 | 13,615,528,055,091 | 26,905,452,573 | 98.8% |
| oct | $446,704.08 | 86.6% | $386,757 | -$657,520 | $296,725 | $90,032 | 14,608,652,245,315 | 8,105,749,570 | 98.9% |
|  | -$586,934.93 | 86.3% | -$506,536 | -$643,794 | -$495,628 | -$10,908 | 14,630,391,511,658 | 118,984,295 | 98.9% |
|  | -$1,414,251.55 | 86.0% | -$1,216,516 | -$691,521 | -$1,286,120 | $69,604 | 15,017,331,881,621 | 4,844,741,921 | 98.9% |
| jan 2000 | -$1,972,824.61 | 85.7% | -$1,691,287 | -$768,426 | -$1,799,835 | $108,547 | 16,154,834,795,302 | 11,782,547,084 | 98.9% |
|  | $600,266.50 | 85.4% | $512,834 | -$676,907 | -$288,265 | $801,099 | 16,431,385,344,032 | 641,759,598,874 | 95.0% |
|  | $697,408.08 | 85.1% | $593,728 | -$592,198 | $428,607 | $165,121 | 17,724,996,288,322 | 27,264,812,868 | 95.2% |
| apr | -$560,643.81 | 84.8% | -$475,575 | -$584,909 | -$599,596 | $124,021 | 17,741,418,480,487 | 15,381,221,905 | 95.1% |
|  | $1,128,849.08 | 84.5% | $954,026 | -$606,622 | -$762,874 | $191,151 | 17,722,088,018,870 | 36,538,798,199 | 94.9% |
|  | $2,056,145.66 | 84.2% | $1,731,133 | -$476,747 | $1,785,803 | -$54,669 | 23,385,098,665,512 | 2,988,746,111 | 96.1% |
| jul | $187,682.07 | 83.9% | $157,402 | -$443,370 | $182,683 | -$25,281 | 23,859,522,711,161 | 639,115,931 | 96.2% |
|  | $1,363,626.40 | 83.5% | $1,139,069 | -$364,248 | $980,979 | $158,089 | 25,932,101,749,143 | 24,992,276,858 | 96.4% |
|  | $717,703.15 | 83.2% | $597,064 | -$318,472 | $720,165 | -$123,101 | 27,150,563,245,770 | 15,153,930,847 | 96.5% |
| oct | $198,051.86 | 82.8% | $164,070 | -$296,538 | $76,061 | $88,009 | 27,340,948,483,073 | 7,745,651,707 | 96.5% |

FIG. 12a.

CALCULATION OF THE COMPENSATORY HEDGE RATIO

| | Swap Notional 1210 | $100,000,000 1230 | 1235 | | | | Bond (nominal): 1255 | $100,000,000 1260 | 1265 | |
|---|---|---|---|---|---|---|---|---|---|---|
| | Receive Rate | 6.578% | Initial pay rate 6.578% 1240 | Adj. pay rate 6.588% 1245 | 1215 1225 1250 | | Bond (coupon interest rate): | 7.250% | 1270 | 1275 |
| 1220 | | No. of Months | Swap PV of Profit | Swap V of Adj. Profit | PV of 1 BP | | No. of Months | PV at Initial Bond Yield 7.151% | PV at Initial Bond Yield 7.161% | PV of 1 BP | Compensatory Hedge Ratio |
| 30-Sep-99 | | | | | | | | $100,709,823 | $100,637,839 | | |
| 30-Sep-99 | | 82 | $0 | -$54,921 | $54,921 | | 120 | $100,705,803 | $100,634,229 | $71,574 | 76.7% |
| oct | | 81 | $0 | -$54,389 | $54,389 | | 119 | $100,701,759 | $100,630,597 | $71,162 | 76.4% |
| nov | | 80 | $0 | -$53,854 | $53,854 | | 118 | $100,697,690 | $100,626,943 | $70,747 | 76.1% |
| dec | | 79 | $0 | -$53,316 | $53,316 | | 117 | $100,693,598 | $100,623,268 | $70,330 | 75.8% |
| jan 2000 | | 78 | $0 | -$52,775 | $52,775 | | 116 | $100,689,481 | $100,619,570 | $69,911 | 75.5% |
| feb | | 77 | $0 | -$52,231 | $52,231 | | 115 | $100,685,340 | $100,615,851 | $69,489 | 75.2% |
| mar | | 76 | $0 | -$51,684 | $51,684 | | 114 | $100,681,174 | $100,612,110 | $69,065 | 74.8% |
| apr | | 75 | $0 | -$51,134 | $51,134 | | 113 | $100,676,983 | $100,608,346 | $68,638 | 74.5% |
| may | | 74 | $0 | -$50,580 | $50,580 | | 112 | $100,672,768 | $100,604,559 | $68,208 | 74.2% |
| jun | | 73 | $0 | -$50,024 | $50,024 | | 111 | $100,668,527 | $100,600,750 | $67,777 | 73.8% |
| jul | | 72 | $0 | -$49,465 | $49,465 | | 110 | $100,664,261 | $100,596,919 | $67,342 | 73.5% |
| aug | | 71 | $0 | -$48,903 | $48,903 | | 109 | $100,659,969 | $100,593,064 | $66,905 | 73.1% |
| sep | | 70 | $0 | -$48,338 | $48,338 | | 108 | $100,655,652 | $100,589,186 | $66,466 | 72.7% |
| oct | | 69 | $0 | -$47,769 | $47,769 | | 107 | $100,651,309 | $100,585,286 | $66,023 | 72.4% |
| nov | | 68 | $0 | -$47,198 | $47,198 | | 106 | $100,646,940 | $100,581,362 | $65,579 | 72.0% |
| dec | | 67 | $0 | -$46,623 | $46,623 | | 105 | $100,642,546 | $100,577,414 | $65,131 | 71.6% |
| jan 2001 | | 66 | $0 | -$46,045 | $46,045 | | 104 | $100,638,125 | $100,573,443 | $64,681 | 71.2% |
| feb | | 65 | $0 | -$45,464 | $45,464 | | 103 | $100,633,677 | $100,569,449 | $64,229 | 70.8% |
| mar | | 64 | $0 | -$44,880 | $44,880 | | 102 | $100,629,204 | $100,565,430 | $63,773 | 70.4% |
| apr | | 63 | $0 | -$44,293 | $44,293 | | 101 | $100,624,703 | $100,561,388 | $63,315 | 70.0% |
| may | | 62 | $0 | -$43,702 | $43,702 | | 100 | $100,620,176 | $100,557,321 | $62,854 | 69.5% |
| jun | | 61 | $0 | -$43,109 | $43,109 | | 99 | $100,615,621 | $100,553,230 | $62,391 | 69.1% |
| jul | | 60 | $0 | -$42,512 | $42,512 | | 98 | $100,611,040 | $100,549,115 | $61,925 | 68.7% |
| aug | | 59 | $0 | -$41,911 | $41,911 | | 97 | $100,606,431 | $100,544,975 | $61,456 | 68.2% |
| sep | | 58 | $0 | -$41,308 | $41,308 | | 96 | $100,601,795 | $100,540,811 | $60,984 | 67.7% |
| oct | | 57 | $0 | -$40,701 | $40,701 | | 95 | $100,597,131 | $100,536,621 | $60,510 | 67.3% |
| nov | | 56 | $0 | -$40,091 | $40,091 | | 94 | $100,592,440 | $100,532,407 | $60,033 | 66.8% |
| dec | | 55 | $0 | -$39,477 | $39,477 | | 93 | $100,587,720 | $100,528,168 | $59,553 | 66.3% |
| jan | | 54 | $0 | -$38,860 | $38,860 | | 92 | $100,582,973 | $100,523,903 | $59,070 | 65.8% |
| feb | | 53 | $0 | -$38,240 | $38,240 | | 91 | $100,578,197 | $100,519,612 | $58,584 | 65.3% |
| mar | | 52 | $0 | -$37,616 | $37,616 | | 90 | $100,573,392 | $100,515,297 | $58,096 | 64.7% |
| apr | | 51 | $0 | -$36,989 | $36,989 | | 89 | $100,568,559 | $100,510,955 | $57,604 | 64.2% |
| may | | 50 | $0 | -$36,358 | $36,358 | | 88 | $100,563,697 | $100,506,587 | $57,110 | 63.7% |
| jun | | 49 | $0 | -$35,724 | $35,724 | | 87 | $100,558,806 | $100,502,194 | $56,613 | 63.1% |
| jul | | 48 | $0 | -$35,087 | $35,087 | | 86 | $100,553,886 | $100,497,774 | $56,112 | 62.5% |
| aug | | 47 | $0 | -$34,446 | $34,446 | | 85 | $100,548,937 | $100,493,328 | $55,609 | 61.9% |
| sep | | 46 | $0 | -$33,801 | $33,801 | | 84 | $100,543,958 | $100,488,855 | $55,103 | 61.3% |
| oct | | 45 | $0 | -$33,153 | $33,153 | | 83 | $100,538,950 | $100,484,356 | $54,594 | 60.7% |
| nov | | 44 | $0 | -$32,501 | $32,501 | | 82 | $100,533,912 | $100,479,829 | $54,082 | 60.1% |
| dec | | 43 | $0 | -$31,846 | $31,846 | | 81 | $100,528,843 | $100,475,276 | $53,567 | 59.5% |
| jan | | 42 | $0 | -$31,187 | $31,187 | | 80 | $100,523,745 | $100,470,696 | $53,049 | 58.8% |
| feb | | 41 | $0 | -$30,525 | $30,525 | | 79 | $100,518,816 | $100,466,088 | $52,528 | 58.1% |
| mar | | 40 | $0 | -$29,859 | $29,859 | | 78 | $100,513,456 | $100,461,453 | $52,004 | 57.4% |
| apr | | 39 | $0 | -$29,189 | $29,189 | | 77 | $100,508,266 | $100,456,790 | $51,477 | 56.7% |
| may | | 38 | $0 | -$28,516 | $28,516 | | 76 | $100,503,045 | $100,452,099 | $50,946 | 56.0% |
| jun | | 37 | $0 | -$27,839 | $27,839 | | 75 | $100,497,793 | $100,447,380 | $50,413 | 55.2% |
| jul | | 36 | $0 | -$27,158 | $27,158 | | 74 | $100,492,509 | $100,442,633 | $49,876 | 54.5% |
| aug | | 35 | $0 | -$26,474 | $26,474 | | 73 | $100,487,194 | $100,437,858 | $49,336 | 53.7% |
| sep | | 34 | $0 | -$25,786 | $25,786 | | 72 | $100,481,847 | $100,433,054 | $48,793 | 52.8% |
| oct | | 33 | $0 | -$25,094 | $25,094 | | 71 | $100,476,469 | $100,428,222 | $48,247 | 52.0% |
| nov | | 32 | $0 | -$24,398 | $24,398 | | 70 | $100,471,058 | $100,423,360 | $47,698 | 51.2% |
| dec | | 31 | $0 | -$23,698 | $23,698 | | 69 | $100,465,615 | $100,418,470 | $47,145 | 50.3% |
| jan | | 30 | $0 | -$22,995 | $22,995 | | 68 | $100,460,140 | $100,413,551 | $46,589 | 49.4% |
| feb | | 29 | $0 | -$22,287 | $22,287 | | 67 | $100,454,632 | $100,408,602 | $46,030 | 48.4% |
| mar | | 28 | $0 | -$21,576 | $21,576 | | 66 | $100,449,091 | $100,403,624 | $45,468 | 47.5% |
| apr | | 27 | $0 | -$20,861 | $20,861 | | 65 | $100,443,517 | $100,398,616 | $44,902 | 46.5% |
| may | | 26 | $0 | -$20,142 | $20,142 | | 64 | $100,437,910 | $100,393,578 | $44,333 | 45.4% |
| jun | | 25 | $0 | -$19,419 | $19,419 | | 63 | $100,432,270 | $100,388,510 | $43,760 | 44.4% |
| jul | | 24 | $0 | -$18,692 | $18,692 | | 62 | $100,426,596 | $100,383,411 | $43,185 | 43.3% |
| aug | | 23 | $0 | -$17,962 | $17,962 | | 61 | $100,420,888 | $100,378,283 | $42,605 | 42.2% |

Fig. 12b

| 1230 | 1235 | 1240 | 1245 | 1250 | 1255 | 1260 | 1265 | 1270 | 1275 |
|---|---|---|---|---|---|---|---|---|---|
| sep | 22 | $0 | -$17,227 | $17,227 | 60 | $100,415,146 | $100,373,123 | $42,023 | 41.0% |
| oct | 21 | $0 | -$16,488 | $16,488 | 59 | $100,409,370 | $100,367,933 | $41,437 | 39.8% |
| nov | 20 | $0 | -$15,745 | $15,745 | 58 | $100,403,560 | $100,362,712 | $40,847 | 38.5% |
| dec | 19 | $0 | -$14,998 | $14,998 | 57 | $100,397,714 | $100,357,460 | $40,254 | 37.3% |
| jan | 18 | $0 | -$14,247 | $14,247 | 56 | $100,391,835 | $100,352,177 | $39,658 | 35.9% |
| feb | 17 | $0 | -$13,491 | $13,491 | 55 | $100,385,920 | $100,346,862 | $39,058 | 34.5% |
| mar | 16 | $0 | -$12,732 | $12,732 | 54 | $100,379,969 | $100,341,515 | $38,454 | 33.1% |
| apr | 15 | $0 | -$11,968 | $11,968 | 53 | $100,373,984 | $100,336,136 | $37,847 | 31.6% |
| may | 14 | $0 | -$11,201 | $11,201 | 52 | $100,367,962 | $100,330,725 | $37,237 | 30.1% |
| jun | 13 | $0 | -$10,429 | $10,429 | 51 | $100,361,905 | $100,325,282 | $36,623 | 28.5% |
| jul | 12 | $0 | -$9,653 | $9,653 | 50 | $100,355,812 | $100,319,807 | $36,005 | 26.8% |
| aug | 11 | $0 | -$8,872 | $8,872 | 49 | $100,349,682 | $100,314,299 | $35,383 | 25.1% |
| sep | 10 | $0 | -$8,088 | $8,088 | 48 | $100,343,516 | $100,308,757 | $34,758 | 23.3% |
| oct | 9 | $0 | -$7,299 | $7,299 | 47 | $100,337,313 | $100,303,183 | $34,130 | 21.4% |
| nov | 8 | $0 | -$6,505 | $6,505 | 46 | $100,331,073 | $100,297,576 | $33,497 | 19.4% |
| dec | 7 | $0 | -$5,708 | $5,708 | 45 | $100,324,796 | $100,291,935 | $32,861 | 17.4% |
| jan | 6 | $0 | -$4,905 | $4,905 | 44 | $100,318,481 | $100,286,260 | $32,221 | 15.2% |
| feb | 5 | $0 | -$4,099 | $4,099 | 43 | $100,312,129 | $100,280,552 | $31,577 | 13.0% |
| mar | 4 | $0 | -$3,288 | $3,288 | 42 | $100,305,739 | $100,274,810 | $30,930 | 10.6% |
| apr | 3 | $0 | -$2,473 | $2,473 | 41 | $100,299,311 | $100,269,033 | $30,278 | 8.2% |
| may | 2 | $0 | -$1,653 | $1,653 | 40 | $100,292,845 | $100,263,222 | $29,623 | 5.6% |
| jun | 1 | $0 | -$829 | $829 | 39 | $100,286,340 | $100,257,376 | $28,964 | 2.9% |
| jul | 0 | $0 | -$0 | $0 | 38 | $100,279,796 | $100,251,495 | $28,301 | 0.0% |

Fig. 13.

CALCULATION OF THE CORRELATION BETWEEN SWAP AND RATIO HEDGE BOND

| | Swap Notional /Receive Rate 1305 | $100,000,000 1310 | Hypothetical Rate 6.233% | 6.578% 1315 | | | | | |
|---|---|---|---|---|---|---|---|---|---|
| 1307 | | No. of Months | (Per Counterparty) Swap MTM | Actual month-end CP Rate 1320 | Using CP at month end + 18 bps 1325 | Settlement on 15-Jan 15-Jul No. of days of accrued interest 1330 | Market Yield 1335 | Accrued Interest 1340 | Adjusted MTM (excl. accrued int.) 1345 | Monthly Change Adj. MTM 1350 |

| | No. of Months | Swap MTM | Actual floating rate | | No. of days of accrued interest | Market Yield | Accrued Interest | Adjusted MTM (excl. accrued int.) | Monthly Change Adj. MTM |
|---|---|---|---|---|---|---|---|---|---|
| 30-Sep-99 | | | | | | | $0 | $0 | |
| 30-Sep-99 | 82 | $0 | | | | 6.578% | $0 | $0 | $0 |
|  | 81 | $333,504 | | | | 6.516% | $0 | $333,504 | $333,504 |
|  | 80 | -$264,555 | | | | 6.627% | $0 | -$264,555 | -$598,060 |
| dec | 79 | -$1,824,166 | | | | 6.923% | $0 | -$1,824,166 | -$1,559,611 |
|  | 78 | -$3,918,538 | | | | 7.337% | $0 | -$3,918,538 | -$2,094,372 |
|  | 77 | -$3,381,203 | | | | 7.238% | $0 | -$3,381,203 | $537,335 |
| mar | 76 | -$2,779,125 | | | | 7.124% | $0 | -$2,779,125 | $602,078 |
|  | 75 | -$3,413,984 | | | | 7.259% | $0 | -$3,413,984 | -$634,859 |
|  | 74 | -$4,579,874 | | | | 7.508% | $0 | -$4,579,874 | -$1,165,891 |
| jun | 73 | -$2,616,296 | | | | 7.109% | $0 | -$2,616,296 | $1,963,578 |
|  | 72 | -$2,402,537 | | | | 7.070% | $0 | -$2,402,537 | $213,760 |
|  | 71 | -$1,186,585 | | | | 6.822% | $0 | -$1,186,585 | $1,215,951 |
| sep | 70 | -$480,605 | | | | 6.677% | $0 | -$480,605 | $705,980 |
| -2,169,362 | 69 | -$2,100,078 | 6.48% | 6.66% | 108 | | -$125,224 | -$1,974,854 | $194,508 |

Bond (nominal): 1355 $100,000,000 1360
Bond (coupon interest rate): 7.250%

| No. of Months | Computed Bond Value | Actual Libor Swap Yield 1365 | Constant Yield Differential 1370 | Constant Diff. Libor vs CP Swap 1375 | Effective Swap Yield 1380 | Bond Price If Yield Unchanged 1385 | Amort of Premium 1390 | Bond Value Mthly Change 1395 |
|---|---|---|---|---|---|---|---|---|
| 120 | 101.4250% | 6.8300% | 0.3210% | 0.1000% | 7.0510% | 101.425% | | |
| 120 | 101.4250% | 6.8300% | 0.3210% | 0.1000% | 7.0510% | 101.425% | 0.000% | $0 |
| 119 | 102.0173% | 6.7467% | 0.3210% | 0.1000% | 6.9677% | 101.417% | 0.008% | $600,463 |
| 118 | 100.5054% | 6.9572% | 0.3210% | 0.1000% | 7.1782% | 101.409% | 0.008% | -$1,503,627 |
| 117 | 99.2238% | 7.1408% | 0.3210% | 0.1000% | 7.3618% | 101.400% | 0.008% | -$1,273,266 |
| 116 | 96.8947% | 7.4856% | 0.3210% | 0.1000% | 7.7066% | 101.392% | 0.008% | -$2,320,774 |
| 115 | 97.5232% | 7.3939% | 0.3210% | 0.1000% | 7.6149% | 101.383% | 0.008% | $636,938 |
| 114 | 98.5422% | 7.2437% | 0.3210% | 0.1000% | 7.4647% | 101.375% | 0.008% | $1,027,409 |
| 113 | 97.6624% | 7.3773% | 0.3210% | 0.1000% | 7.5983% | 101.367% | 0.009% | -$871,258 |
| 112 | 96.1524% | 7.6114% | 0.3210% | 0.1000% | 7.8324% | 101.358% | 0.009% | -$1,501,434 |
| 111 | 98.6164% | 7.2365% | 0.3210% | 0.1000% | 7.4575% | 101.349% | 0.009% | $2,472,573 |
| 110 | 98.7125% | 7.2232% | 0.3210% | 0.1000% | 7.4442% | 101.341% | 0.009% | $104,775 |
| 109 | 100.4401% | 6.9629% | 0.3210% | 0.1000% | 7.1839% | 101.332% | 0.009% | $1,736,237 |
| 108 | 101.0556% | 6.8700% | 0.3210% | 0.1000% | 7.0910% | 101.323% | 0.009% | $624,274 |
| 107 | 101.3145% | 6.8300% | 0.3210% | 0.1000% | 7.0510% | 101.314% | 0.009% | $267,692 |

Fig_14

| | 1410 | 1415 | 1420 | 1425 | 1430 | 1435 | 1440 | 1445 | 1450 |
|---|---|---|---|---|---|---|---|---|---|
| 1405 | Bond Value Mthly Change | Compensatory Hedge Ratio | X Hedged Bond MTM mthly change (24*25) | averg. x Life-to-date Hedged Bond MTM mthly change | Y Swap MTM Mthly Change | Ineffective Portion of Swap MTM (26-27) Y minus X | Square of Total Deviation SST | Square of Unexplained Dev (ineffect.portion) SSE | $r^2$ |
| 30-Sep-99 | $0.00 | 76.7% | 0 | 0 | $0 | 0 | 0 | 0 | |
| | $600,462.93 | 76.4% | 458,935 | 229,467 | $333,504 | 125,431 | 63,478,928,851 | 15,732,832,515 | 75.2% |
| dec | -$1,503,626.62 | 76.1% | -1,144,583 | -228,549 | -$598,060 | -546,523 | 504,676,712,291 | 298,687,349,311 | 37.7% |
| | -$1,273,266.40 | 75.8% | -965,233 | -412,720 | -$1,559,611 | 594,378 | 2,076,897,321,496 | 353,285,391,893 | 67.9% |
| | -$2,320,774.27 | 75.5% | -1,751,915 | -680,559 | -$2,094,372 | 342,456 | 4,269,888,798,888 | 117,276,296,651 | 81.6% |
| | $636,938.08 | 75.2% | 478,747 | -487,342 | $537,335 | -58,588 | 5,705,816,121,978 | 3,432,549,673 | 86.2% |
| mar | $1,027,406.66 | 74.8% | 768,845 | -307,886 | $602,078 | 166,767 | 6,891,153,721,126 | 27,811,094,331 | 88.2% |
| | -$871,257.52 | 74.5% | -649,066 | -350,534 | -$634,859 | -14,207 | 6,931,508,772,406 | 201,837,756 | 88.2% |
| | -$1,501,434.31 | 74.2% | -1,113,399 | -435,297 | -$1,165,891 | 52,492 | 7,419,392,361,062 | 2,755,374,621 | 89.0% |
| jun | $2,472,573.07 | 73.8% | 1,824,951 | -209,272 | $1,963,578 | -138,627 | 12,899,803,490,559 | 19,217,411,768 | 93.5% |
| | $104,775.02 | 73.5% | 76,961 | -183,251 | $213,760 | -136,799 | 13,091,439,955,855 | 18,713,870,414 | 93.5% |
| | $1,736,237.04 | 73.1% | 1,269,070 | -62,224 | $1,215,951 | 53,118 | 14,979,915,613,565 | 2,821,573,034 | 94.3% |
| sep | $624,273.86 | 72.7% | 454,010 | -22,514 | $705,980 | -251,971 | 15,564,479,116,344 | 63,489,285,989 | 94.1% |
| | $267,692.47 | 72.4% | 193,681 | -7,071 | $194,508 | -826 | 15,614,017,438,151 | 682,853 | 94.1% |

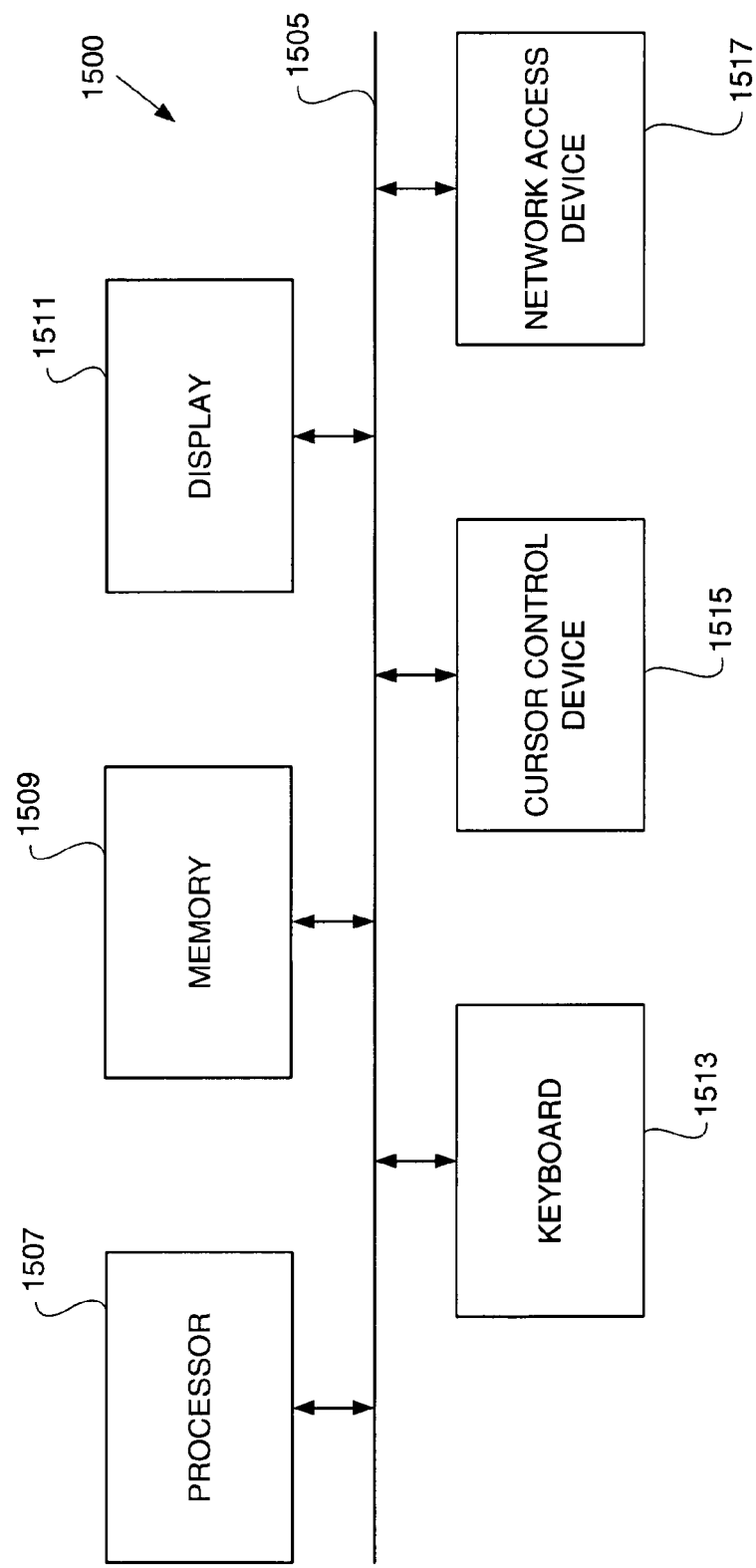

COMPENSATORY RATIO HEDGING

TECHNICAL FIELD

The present invention relates generally to financial accounting and more particularly to a method for accounting for derivative instruments and hedging activities.

BACKGROUND INFORMATION

In June, 1998, the Financial Accounting Standards Board ("FASB") issued a new standard entitled Statement of Financial Accounting Standards No. 133, Accounting for Derivative Instruments and Hedging Activities ("FAS 133") that must be implemented for calendar-year business entities effective Jan. 1, 2001. FAS 133 requires that all derivative financial instruments, with only a few defined exceptions, be booked and adjusted to fair value at least quarterly. This is a huge departure from earlier standards and accounting traditions. Financial instruments or contracts, known as derivatives, except in a few defined exceptions, were accounted for at historical cost, and this cost was amortized. Hence, there is now a distinction between derivative financial instruments (e.g., at fair value) versus financial instruments (e.g., at amortized cost).

Complications arise in particular when a derivative financial instrument, the hedge, is used to hedge a financial instrument, the hedged item. If the derivative financial instrument does not meet the FAS 133 requirements for special hedge accounting of cash flow, fair value, or foreign exchange hedges, any changes in fair value are reported in earnings. Special hedge accounting, thus, is a privilege, not a right. Qualifying criteria includes, for example: (a) identifying the hedged item; (b) identifying and designating the hedging instrument; (c) identifying the type of hedge; (d) planning and documenting the hedge strategy; and (e) measuring effectiveness at least quarterly. It is important to understand that the FASB has not defined an effectiveness test to measure the effectiveness of the hedge to be used by business entities to qualify under special hedge accounting.

As a result of FAS 133, many business entities' current accounting methodologies are not permitted without serious reporting implications. For example, currently, under synthetic instrument accounting which some business entities utilize, interest rate swaps are "off balance sheet." Swaps are the most common form of hedging interest rate risk using financial instruments derivatives. A swap is basically an agreement in which two parties exchange payments over a period of time. The purpose is normally to transform debt payments from one interest rate base to another, for example, from fixed to floating or from one currency to another.

More specifically, an interest rate swap is a contractual agreement entered into between two parties under which each agrees to make periodic payment to the other for an agreed period of time based upon a notional amount of principal. The principal amount is notional because there is no need to exchange actual amounts of principal in a single currency transaction because there is no foreign exchange component to be taken into account. Equally, however, a notional amount of principal is required in order to compute the actual cash amounts that will be periodically exchanged.

Under the most common form of interest rate swap, a series of payments calculated by applying a fixed rate of interest to a notional principal amount is exchanged for a stream of payments similarly calculated but using a floating rate of interest. In other words, one party pays a fixed rate calculated at the time of trade as a spread to a particular Treasury bond, and the other side pays a floating rate that resets periodically throughout the life of the deal against a designated index.

As a result of these types of interest rate swaps currently being "off balance sheet," as explained above, an entity will book the net gain (or loss) from the swaps to its income statement as a reduction (or addition) to net interest expense but do not book the mark-to-market("MTM") value of the swap during the life of the swap and do not adjust the book value of the hedged bond during the life of the swap. Additionally, under these circumstances prior to FAS 133, if a swap were terminated prior to maturity, any termination settlement (MTM gain or loss) would be booked as an adjustment to the bond's book value and amortized over the remaining life of the bond. Again, however, due to FAS 133 this methodology is no longer permitted.

Business entities that seek to qualify for special hedge accounting by categorizing swaps as "fair value hedges" under FAS 133 must satisfy two primary requirements.

The first primary requirement is that the swap be "highly effective." If the effectiveness of the hedge is less than 80% or more than 125% of the matched risk, the hedge fails the effectiveness test and none of the swap MTM volatility can be offset. The highly effective test must be successfully satisfied throughout the life of the swap and not just at inception. If a particular methodology results in a number of swaps failing the test during the life of the swap, accountants may question whether this methodology should be allowed with any swaps.

The second primary requirement concerns how closely the swap MTM correlates or matches with the bond's MTM, assuming the swap qualifies as highly effective. To the extent they do not offset ("ineffectiveness"), the differential flows through the income statement and creates earnings volatility.

Since the FASB has not defined a test to measure the effectiveness of the hedge, there is a need for a methodology doing so. The present invention provides an effectiveness test methodology to qualify under special hedge accounting by creating a methodology for mismatched maturity hedging, called compensatory ratio hedging, that is sufficiently dynamic to accommodate the differences in swap and bond valuation drivers.

DISCLOSURE OF THE INVENTION

Briefly, in accordance with one embodiment of the invention, a method of compensatory ratio hedging includes: hedging the amount of a bond by a swap where the amount of the bond hedged by the swap varies during the life of the swap such that the swap mark-to-market value changes similarly to the hedged bond mark-to-market value. This is accomplished by varying the ratio of the bond being hedged to the swap in each predetermined period of time to compensate for differences in swap and bond valuations.

Briefly, in accordance with one more embodiment of the invention, a method for obtaining a compensatory hedge ratio includes, first, determining the amount of a swap being issued and using the same amount for a bond. Second, determining the period of time of swap maturity. Third, calculating the present value of a one basis point change in swap yield and calculating the present value of a one basis point change in bond yield. And fourth, computing the compensatory hedge ratio by dividing the present value of a one basis point change in swap yield by the present value of a one basis point change in bond yield.

Briefly, in accordance with another embodiment of the invention, a method for determining ineffectiveness using a compensatory hedge ratio includes: calculating the difference between the hedged bond MTM change in a predetermined period of time and the swap MTM change in the same predetermined period of time.

Briefly, in accordance with still another embodiment of the invention, a method for determining the effectiveness between the hedged bond MTM change in a predetermined period of time and the swap MTM change in the same predetermined period of time includes: calculating the difference between one and the division of the sum of a predetermined period of time square of ineffectiveness by the square of total deviation.

BRIEF DESCRIPTION OF THE DRAWINGS

The subject matter regarded as the invention is particularly pointed out and distinctly claimed in the concluding portion of the specification. The invention, however, both as to organization and method of operation, may best be understood by reference to the following detailed description, when read with the accompanying drawings, in which:

FIG. 1 is a flowchart outlining the basic methodology and sequences involved in computing a compensatory hedge ratio.

FIG. 2 is an exemplary summary spreadsheet of varying swap and bond amounts with valuations of basis point at inception and with twelve months remaining.

FIG. 3 is an exemplary spreadsheet (Exhibit 1) depicting the components involved in calculating compensatory hedge ratio's.

FIGS. 4-5 are exemplary spreadsheets (Exhibit 1) depicting the components involved in calculating correlation's between swap MTM and bond MTM over a predetermined period of time.

FIGS. 6-14 are further exemplary spreadsheets (Exhibits 2-4) depicting the components involved in calculating compensatory hedge ratio's as well as the components involved in calculating correlation's between swap MTM and bond MTM over a predetermined period of time.

FIG. 15 is an architecture diagram of a computer system for performing the method sequences of the present invention.

DETAILED DESCRIPTION OF THE INVENTION

In the following detailed description, specific details are set forth in order to provide a thorough understanding of the invention. However, it will be understood by those skilled in the relevant art that the present invention may be practiced without these specific details. In other instances, well known methods, procedures, and components have not been described in detail so as not to obscure the present invention.

A. Risk Management Objectives and Strategy

Many business entities issue long-term debt to best match their long-term funding needs. The debt is generally issued at fixed interest rates, as the U.S. debt market for long-term debt is concentrated in fixed rate loans. While fixed interest rates generate predictable interest expense, it creates several disadvantages. First, for example, unless a business entity accurately times the interest rate cycle, it may not issue debt at the lowest possible interest rate. And since a business entity's business needs are a significant determinant on when debt is issued, a business entity has limited opportunity to time the market. Second, for example, the interest rate yield curve for fixed interest rate debt typically has a positive slope so long maturity fixed interest rate debt will typically have a higher total lifetime interest expense than variable interest rate debt. Third, for example, many business entities' earnings are significantly affected by variations in the global gross domestic product ("GDP") growth rates. Some analysts suggest that variable interest rate debt will reduce earnings volatility because variable interest rates and a business entity's profits are both positively correlated with GDP growth—so variable interest rates could reduce earnings volatility which could improve shareholder value. Fourth, for example, many business entities are exposed to variability in the fair value of the debt market value due to changes in the general level of market interest rates. For the above reasons, some business entities have an objective or goal to have floating interest rate exposure between 60% to 70% of total issued debt.

Many business entities' risk management objectives, therefore, are to mitigate the fair value variability of specified fixed-rate debt obligations (i.e., selected proportions of contractual payments of fixed-rate debt obligations). For example, some business entities meet this objective by entering into interest rate swaps and paying interest at a variable interest rate and receiving interest at a fixed interest rate. Through the use of a swap, then, business entities can hedge a proportion of the fixed-rate debt obligation's principal and/or interest contractual payment amounts ("hedged debt"), generally, but not necessarily, for the remainder of the fixed-rate debt obligation's maturity.

B. FAS 133

The FASB has mandated new rules for derivative instruments under FAS 133 that must be implemented effective Jan. 1, 2001. As a result of FAS 133, many business entities current accounting methodologies are not permitted.

For example, under a synthetic instrument accounting methodology, which some business entities currently utilize, interest rate swaps are considered "off balance sheet". Under this methodology, an entity books the net gain or loss from the swaps to the income statement as a reduction (or addition) to net interest expense. Entities do not book the MTM value of the swap during the life of the swap and do not adjust the book value of the hedged bond during the life of the swap. Further, if a swap were terminated prior to maturity, any termination settlement (MTM gain or loss) would be booked as an adjustment to the bond's book value and amortized over the remaining life of the bond. Due to FAS 133 requirements, this methodology is no longer permitted.

To avoid the financial reporting implications of current accounting methodologies, business entities that seek to qualify for special hedge accounting by categorizing swaps as "fair value hedges" under FAS 133 must satisfy two primary requirements.

The first primary requirement is that the swap be "highly effective." If the effectiveness of the hedge is less than 80% or more than 125% of the matched risk, the hedge fails the effectiveness test and none of the swap MTM volatility can be offset. The highly effective test must be successfully satisfied throughout the life of the swap and not just at inception. If a particular methodology results in a number of swaps failing the test during the life of the swap, accountants may question whether this methodology should be allowed with any swaps.

The second primary requirement concerns how closely the swap MTM correlates or matches with the bond's MTM, assuming the swap qualifies as highly effective. To the extent they do not offset ("ineffectiveness"), the differential flows through the income statement and creates earnings volatility.

Since the FASB has not defined (to date) the effectiveness test to be used by business entities, an embodiment of the present invention is an effectiveness test methodology to qualify under special hedge accounting by creating a methodology for mismatched maturity hedging, called compensatory ratio hedging, that is sufficiently dynamic to accommodate the differences in swap and bond valuation drivers.

C. Effectiveness Test Methodology

In the preferred embodiment, a business entity designates an interest rate swap as the fair value hedge of a proportion of the fixed-rate debt obligation as specified when each interest rate swap is issued.

The swap notional amount is established as a hedge of varying bond notional amounts. The bond notional amounts are specified in a predetermined period of time (e.g., monthly or quarterly) schedule on the swap inception date. The bond notional amounts are preferably established such that the swap is effective in offsetting the change in market value of the hedged contractual bond payments.

Again, a business entity preferably identifies the interest rate swap and applicable fixed-rate debt obligation at swap inception for nonlimiting elements such as, notional amount (which varies per a specified schedule for the fixed-rate debt obligation), premium/discount, fixed leg payer, fixed (receive) leg, variable leg payer, variable (pay) leg, settlement, and effectiveness termination date, for example. The variable interest rate is preferably a short-term interest rate index, such as commercial paper or Libor, for example, with a maturity of one, two, or three months, for example, and may or may not include a spread over the index.

Preferably, changes in the fair value of the interest rate swap are highly effective (as required by FAS 133) in offsetting changes in the fair value of the debt obligation's hedged contractual payments caused by fluctuations in market interest rates. The procedure and methodology to assess such hedge effectiveness ("effectiveness") is the square of the correlation between predetermined period of time (e.g., monthly) changes in the MTM values of a swap and hedged debt (e.g., bond) caused by the movement of the swap yield and the benchmark interest rate component of the bond yield, respectively. Any changes in interest rate yields cause the MTM values to vary.

The swap MTM is determined at the end of each predetermined period of time (e.g., month or calendar quarter) using, for example, a business entity treasury work station (e.g., Trema FinanceKit), Bloomberg's interest rate swap valuation model, or a counterparty's valuation. The predetermined period of time change in the swap MTM value is determined by the difference between the swap's MTM value at the end of the current predetermined period of time (e.g., current month-end) and the swap's MTM value at the end of the prior predetermined period of time (e.g., prior month-end).

The hedged debt MTM is determined by first calculating the fair value of the hedged debt at the end of each predetermined period of time. Specifically, at swap inception, the notional amount of debt being hedged in each predetermined period of time (e.g., monthly) is determined. The hedged debt and swap preferably have the same dollar value volatility or sensitivity to an equal basis point movement in their yields.

Second, at the end of each predetermined period of time following swap inception, calculating the hedged debt's MTM value applicable to each swap by (a) determining the benchmark interest rate (e.g., the Libor swap yield) for the same maturity as the business entity bond being hedged; (b) calculating the change in market price from the prior predetermined period of time (e.g., prior month-end) to the current predetermined period of time (e.g., current month-end) where the market price is calculated, for example, using the applicable benchmark interest rate plus the original yield differentials (e.g., difference at swap inception date between (i) the business entity bond yield and Libor swap yield and (ii) the Libor to Commercial paper basis swap spread); (c) removing the change in market price caused by amortization of the bond premium (or discount) to par value, if any, that existed at the swap inception date; and (d) calculating the MTM dollar value change of the hedged debt (using the data from (b) and (c) above and the amount of debt being hedged in that predetermined period of time).

At the end of each predetermined period of time (e.g. month-end), the correlation between the predetermined period of time (e.g., monthly) changes in the market values of the swap and hedged debt from the swap inception date through the current predetermined period of time (e.g., current month) is determined. The swap is highly effective, as required by FAS 133, if the square of the correlation percentage is within the range of 0.80 to 1.00 (although FAS 133 would allow an upper limit of 125%, correlation has a statistical limit of 100%, so effectiveness has an upper limit of 1.00). As a result of FAS 133, the predetermined period of time changes to the MTM value of the swap and hedged debt will be booked to the income statement. Ineffectiveness is the dollar difference between these MTM amounts.

To have a statistically valid correlation, at least twenty-four (24) data points are preferable. Accordingly, at swap inception, to prove effectiveness, periods or months, such as twenty-four (24) months, of "hypothetical" historical data is constructed using actual swap and bond yields that occurred during this twenty-four (24) month period. As actual data is accumulated following swap inception, a rolling twenty-four (24) month period is utilized until all hypothetical historical data is eliminated. All actual data from swap inception will be then used to prove effectiveness.

D. Compensatory Ratio Hedging

As there is no FASB published methodology for mismatched maturity hedging, the present invention includes a methodology based on sound finance and accounting logic that is sufficiently dynamic to accommodate the differences in swap and bond valuation drivers. Swap and bond valuations react differently to a similar change in interest rates for several exemplary reasons such as: different durations (even if same maturity); different maturities; maturity mismatch changes during the life of the swap; non-parallel shifts in the interest rate yield curve that accentuates any duration mismatch; different bonds have different interest rates affecting duration; and the bond price may be at a premium or discount to its par value at swap inception, for example.

The present invention's solution, thus, for mismatched maturity hedging is a methodology called compensatory ratio hedging whereby the amount of bond that is hedged by a swap varies during the life of the swap, per a predetermined schedule, calculated at swap inception, such that the change in the swap's MTM dollar value would be equal to the change in the hedged bond's market value caused by an equal change in interest rates. The amount of bond being hedged by the swap will vary by month, for example, to compensate for the differences in swap and bond valuation drivers. An exemplary flowchart is shown in FIG. 1 outlining the basic methodology and sequences or steps 100-160 involved and will be explained in more detail below. The goal is to establish the hedge such that an interest rate change has a similar dollar impact on the swap MTM value and the bond market value. This is preferably expressed as the dollar value per basis point.

Referring now to FIG. 2, four hedging examples, Exhibits 1-4, are summarized (of which Exhibit 1 will be explained in more detail and Exhibits 2-4 will be shown in detail below). As shown in the portion indicated by numeral 200 in FIG. 2, each of the Exhibits 1-4 have two columns with associated values. Specifically, column 210 in FIG. 2 is the "Value of 1 Basis Point At Initial Date" and column 220 is "Value of 1 Basis Point With 12 Months Remaining."

As shown in the portion indicated by numeral 230 in FIG. 2, each of the Exhibits 1-4 depict the hedge ratio "At Initial Date", indicated by numeral 240, and "With Twelve Months Remaining", indicated by numeral 250. The hedge ratio is the bond amount being hedged as a percentage of the swap notional amount. The hedge ratios are logical. An interest rate change has a greater dollar impact on a longer maturity bond. So, a lesser bond notional amount can be hedged by a given swap amount when the bond maturity is longer.

In FIG. 2, on the "Initial Date", the hedge ratios are used to determine the bond notional amount being hedged. For example, a $100 million swap in Exhibit 3 would hedge a $88.9 million bond notional amount. This generates a "perfect" matching of swap and bond value volatility.

However, there is a changing relationship when there is maturity mismatch, as shown in Exhibits 2-4 in FIG. 2. Exhibit 2, for example, shows an initially moderate mismatch (7 year bond verses 5 year swap provides a maturity ratio of 1.4 to 1). By end of year 4, the maturity mismatch is wide (3 year bond versus a 1 year swap provides a maturity ratio of 3 to 1). Thus, the percentage hedging relationship is varied between the bond and swap to maintain similar amounts of dollar value volatility as the maturity ratio changes.

At swap inception, as shown in column 210 of portion 200 in FIG. 2, the present value of one basis point for the swap and bond at each predetermined period of time (e.g., month) is calculated to compute a schedule of predetermined periods of time (e.g., monthly) compensatory hedging ratios that can be expected to equalize the dollar volatility in the swap and bond MTM values.

The bond premium or discount (at inception of the swap) will amortize over the remaining bond life. To prepare this amortization schedule, the expected bond price is computed by keeping the bond yield consistent and calculating the present value of the remaining payment stream. The changes in a predetermined period of time (e.g., monthly) in the present value stream becomes the amortization schedule.

The impact of the change in the bond's benchmark interest rate is therefore the total monthly change, using the original yield differentials, minus the amortization of bond premium (or plus the amortization of the bond discount). By removing the amortization of bond premium or discount, the change in bond value caused by movement of the bond's benchmark interest rate is determined. It is this change in bond value that the swap is hedging.

E. Correlation and Effectiveness

Correlation is preferably measured between the actual changes in the swap MTM and the hedged bond MTM. If the hedging ratio has resulted in the "perfect" matching of bond and swap notional amounts, then the dollar change in the swap MTM value should be exactly equal to the dollar change in the hedged bond MTM. As previously stated, to be "highly effective" as required by FAS 133, effectiveness (correlation squared) must exceed 0.80 but not exceed 1.00. Further, as previously mentioned, the dollar offset will generate accounting entries to book changes in swap and bond MTM values. More details of Sections D and E are explained below.

F. Hedging Calculation Details

Referring now to FIG. 3, an exemplary compensatory hedge ratio is determined. First, and preferably, the bond being hedged by the swap is identified, as shown in the FIG. 1 flowchart by numeral 100. Next, the amount of the swap being issued is preferably the same as the amount of the bond, as shown by numeral 110 in FIG. 1. For example, in FIG. 3, the dollar amounts are based on a swap of $100 million and a bond having a principal amount of $100 million as designated by numerals 310 and 315. In this example, the swap amount has a receive rate, or swap fixed interest rate, of 5.085% and the bond has a coupon interest rate of 6.000% as designated by numerals 320 and 325.

Second, the length of the swap or swap maturity is determined, as shown in the FIG. 1 flowchart by numeral 120. In this instance, as shown in FIG. 3, the length of the swap is forty-nine (49) months (i.e., all actual months plus a sufficient number of hypothetical periods or months so that at least twenty-four (24) monthly data points are available for the effectiveness calculation) as shown by the timelines in columns 330 and 335. Specifically, column 330 shows the swap inception date and the calendar month-end and column 335 shows the number of months remaining in the swap's life as of the calendar date in column 330.

Third, the present value of a one basis point change in the swap yield is calculated, as shown in the FIG. 1 flowchart by numeral 130, specifically by, as shown in FIG. 3: (a) determining a projected monthly profit of a swap by calculating the difference between the initial one month commercial paper interest rate and the swap's fixed interest rate; (b) computing the present value of the future swap profits using the swap's fixed interest rate as the discount rate, as shown in column 340; (c) computing the present value of the future swap profits if the initial pay rate increases by one basis point, as shown in column 345; and (d) calculating the difference between the computations in (c) and (b) immediately above, as shown in column 350.

Fourth, the present value of a one basis point change in the bond yield is calculated as shown in the FIG. 1 flowchart by numeral 140, specifically by, as shown in FIG. 3: (a) determining the period of time (e.g., number of months or quarters) remaining in the bond maturity (until redemption), as shown in column 355; (b) computing the present value of the future bond interest and principal payments using the bond's initial market yield (at the beginning of the analysis in column 330), as shown in column 360; (c) computing the present value of the future bond interest and principal payments using the bond's initial market yield plus one basis point as the discount rate, as shown in column 365; and (d) calculating the difference between the computations in (c) and (b) immediately above, as shown in column 370.

Fifth, the ratio of the bond notional amount that is being hedged by a given swap notional amount, called the compensatory hedge ratio, is calculated, as shown in the FIG. 1 flowchart by number 150, by dividing, as shown in column 375 in FIG. 3: (1) the computation obtained in (d) of the third step by (2) the computation obtained in (d) of the fourth step. The compensatory hedge ratio is then preferably calculated for each month or quarter, for example, on the swap maturity schedule, as shown in column 375.

As a result of this methodology, the compensatory hedge ratio can be determined and utilized in determining ineffectiveness (i.e., the extent that the swap MTM and bond MTM do not offset one another) and efficiently satisfying the effectiveness test. The compensatory hedge ratio is the genius behind satisfying the test and is determined for each predetermined period of time of the swap maturity schedule, as shown in the FIG. 1 flowchart by numeral 160. Again, ineffectiveness flows through the income statement and creates undesired earnings volatility unless the effectiveness test is satisfied by creating effectiveness between the swap MTM and bond MTM, from swap inception to current month-end, that exceeds 0.80 but is lower than 1.00 at every month-end (measured from swap inception to each month-end).

G. Ineffectiveness

Now referring to FIGS. 4 & 5, which show the exemplary steps in determining the ineffectiveness portion between swap MTM and bond MTM values as well the associated effectiveness using the compensatory hedge ratio.

In FIG. 4, the calculation of the swap adjusted MTM change in a month is determined first, as shown in column 450. Specifically, initial columns 405 and 410, in FIG. 4, repeat the timeline data shown in columns 330 and 335 in FIG. 3. During any hypothetical period, column 415, reflects the swap MTM. Swap MTM is calculated using the present value of the projected swap profit (market yield from column 435 less the receive rate 407). After the hypothetical period, column 415, includes the swap MTM values from counterparty banks that include the gain (or loss) that has accrued since the last swap settlement date. Since the bond price does not include accrued interest, the accrued profit from the swap MTM valuation is eliminated so that there is a valid comparison to the bond. These valuations may be obtained from an internal treasury workstation, Bloomberg, or from banks, for example.

Next, column 420 in FIG. 4, shows the actual commercial paper ("CP") rate which is the variable interest rate since the last swap settlement pay date. To be more efficient, the rate may be approximated by using the average commercial paper rate during the most recent month, for example. In column 425, the actual floating rate is depicted showing, in this example, that the effective cost is approximately eighteen (18) basis points above the quoted commercial paper rate (due to interest compounding rules in swap contacts). Column 430 depicts the number of calendar days from the last swap settlement date to current month-end. Column 435 shows the market yield of a swap with a maturity equal to column 410 as of the date in column 405. Column 440 depicts the accrued gain (or loss) since the last swap settlement date utilizing the profit margin (the swap's receive rate less the floating rate in column 425) for the number of days in column 430. Column 445 is the adjusted swap MTM (excluding accrued gain or loss) obtained from the difference between column 415 and column 440. Finally, column 450 is the month to month change in swap MTM calculated using the current and previous rows of column 445.

After calculating the swap adjusted MTM change in a month, as shown in column 450 in FIG. 4, the bond value change in a month is calculated, as shown in column 495. Specifically, initial column 455 shows the number of months remaining in the bond maturity (repeat of column 355 in FIG. 3) while column 460 depicts the computed bond value or present value of the bond's future interest and principal payments discounted at the effective swap yield in column 480. Next, column 465 shows the actual Libor swap yield at this calendar date with a maturity equal to the remaining bond maturity in column 455. Column 470 depicts the constant yield differential between the business entity bond and an equivalent maturity swap at the swap inception date. This differential is held constant throughout the life of the swap (thereby allowing measurement of the change in bond value caused solely by the movement of the benchmark interest rate). Next, column 475 shows the Libor to commercial paper interest rate basis swap spread at swap inception date (to convert from a three month Libor rate to thirty day commercial paper rate). As for historical periods, it is preferred that ten basis points are utilized as an approximate historical average. Libor is higher than commercial paper rates, so this differential is deducted when calculating the effective swap yield in column 480. Column 480, as previously stated, is the effective swap yield. The effective swap yield is the bond's yield that would occur at each calendar date if the business entity bond yield only changed due to a change in the benchmark interest rate for the maturity, as shown in column 455.

The effective swap yield is calculated by first adding together column 465 and column 470 and then subtracting from that amount column 475. Next, Column 485 is the present value of the bond's future interest and principal payments at the initial effective swap yield. For each month, the remaining maturity is adjusted to reflect the remaining bond maturity but the discount rate is kept constant. Column 490 is the amortization of premium which is the month-to-month change of the bond price in column 485. Finally, in FIG. 4, column 495 represents the bond value monthly change which is the change in the bond's value caused by the change in the benchmark interest rate (the Libor Swap yield, for example). It is calculated by computing the month-to-month change in the computed bond value (column 460) minus the current month's amortization of premium (column 490) and multiplying by the bond nominal amount (in the header line of column 465).

Next, as shown in column 535 within FIG. 5, for example, ineffectiveness is determined by subtracting the swap adjusted MTM change in a month (see column 450 in FIG. 4 or column 530 in FIG. 5) from the hedged bond MTM change in that month (see column 520 in FIG. 5) the result being the net impact on the income statement. More specifically, initial column 510 is the bond value change in a month (repeat of column 495 in FIG. 4) that is multiplied by the compensatory hedge ratio in column 515 (repeat of column 375 in FIG. 3) to result in the hedged bond MTM monthly change in column 520. Next, in column 525, the average life-to-date hedged bond MTM monthly change is determined. As allowed by FAS 133, the correlation of the swap MTM to the MTM of the hedged risk (the hedged bond) is used to calculate effectiveness. Effectiveness is the coefficient of determination; which is the square of the correlation percentage. To meet the requirements of FAS 133, it is necessary to measure the deviation from a line having a slope of one. To force a slope of one, an average or life-to-date hedged bond MTM monthly change is used rather than an average swap MTM monthly change. The next column 530 is the swap MTM monthly change and is a repeat of column 450 in FIG. 4. Column 535 in FIG. 5 is the ineffectiveness or difference between the hedged bond and swap MTM changes (column 520 minus column 530), per FAS 133 dollar offset logic. Again, this is the net impact on the income statement under FAS 133.

H. Effectiveness

Now referring again to FIG. 5, the determination of the effectiveness is shown. Under FAS 133, the modified statistics formula for the coefficient of determination requires the calculation of the square of total deviation (as shown in column 540) which, in this case, requires the calculation of column 530 (swap MTM monthly change) in each month minus column 525 (life-to-date hedged bond MTM monthly change) from the current month, where each result is squared and then summed. Column 545 is the square of ineffectiveness (or square of column 535) and is also called the sum of the square of unexplained deviation. Finally, the coefficient of determination, or effectiveness, as shown in column 550, is determined by calculating one minus the division of (a) the sum of monthly square of ineffectiveness results in column 545 by (b) the square of total deviation in column 540. In equation form, this is represented as:

$$1 - \frac{\text{(sum of monthly square of ineffectiveness results in column 545)}}{\text{(square of total deviation in column 540)}}$$

Statistically, the result of this equation cannot exceed 1.0, so the allowed range is therefore 0.80 to 1.0 or 80% to 100% (statisticians generally express the coefficient of determination in ratio format, such as 0.80, while FAS 133 expresses effectiveness in percentage format, such as 80%—the two expressions are equivalent and can be used interchangeably). For the swap to satisfy the "highly effective" definition in FAS 133, the effectiveness result must exceed 0.80 at all times after twenty-four monthly data points are accumulated. Thus, twenty-four monthly data points are necessary for the correlation percentage to be statically valid. As a result, the construction of "hypothetical" time periods such that there are at least twenty-four data points at swap inception (or at the Jan. 1, 2001 FAS 133 adoption date) is preferred. Because effectiveness cannot be evaluated with less than twenty-four data points, it may be considered irrelevant by some if the ratio is below 0.80 before the twenty-four monthly data points are accumulated.

The details outlined in the following FIGS. 6-14, although not labeled with specific numerals, are based on the same calculations as explained above with respect to Exhibit 1, but refer to the varying bond and swap maturity schedules in Exhibits 2-4, as summarized briefly in FIG. 2.

I. Effectiveness Test for a Portion of Swap Maturity

A business entity may also, at swap inception, elect to meet the effectiveness test methodology for only a portion of the swap maturity. For example, if a business entity decided to hedge a fifteen-year bond with a five-year swap, the probability of the swap being effective during its fifth year may be low (with one year remaining in the swap, a one year swap yield to an eleven year bond yield would be compared).

Reasonably, the swap yield may be highly correlated during the first fourth years as a medium-term swap yield may move similarly to the yield on a medium term bond (despite a five year versus fifteen year life) because the yield curve is relatively flat during this maturity range.

Alternatively, it is also reasonable that the typical yield curve (which can have a steep slope for maturities under twelve months) could cause the swap yield to move contrary to the bond yield as the remaining swap maturity declines to under twelve months.

Rather than have the risk of the swap failing the effectiveness test, a business entity may prefer to designate the swap (at inception) as being effective for only a portion of the swap life. At swap inception, the business entity preferably designates whether the swap is to be effective throughout the entire swap life or, if designated for only a portion of the swap life, designate the specific termination date for the effectiveness testing.

In the above example, a business entity may designate the swap to be effective for four years beginning at the swap inception date. No effectiveness testing would be done in the swap's fifth year. In year five, the swap MTM would continue to be booked to the financial statements as required by FAS 133. However, in year five, the bond would no longer be mark-to-market. If the business entity decided to use this partial time period election, the decision would be made at swap inception.

J. Computer System Overview

FIG. 15 depicts a block diagram of a general purpose computer system 1500 for performing the individual steps of the method of the present invention. The computer system 1500 includes a processor 1507, memory 1509, display device 1511, keyboard 1513, cursor control device 1515, and computer network access device 1517 each coupled to a bus 1505. Although not individually shown, bus 1505 typically includes an address bus, data bus, and control bus. Cursor control device 1515 may be a mouse, trackball, pen or any other device for manipulating a cursor on display device 1511. Both the cursor control device 1515 and the keyboard 1513 enable the computer system 1500 to receive input from a computer-user. Network access device 1517 may be a modem, network adapter card or any other device for coupling computer 1500 to a computer network.

Memory 1509 may include both system memory (e.g., random access memory) and non-volatile storage such as a semiconductor read-only-memory, hard disk-drive, floppy disk-drive, optical disk-drive or any other computer-readable medium. When power is applied to the computer system 1500, program code defining an operating system is loaded from non-volatile storage into system memory by processor 1507 or another device, such as a direct memory access controller (not shown), having access to memory 1509. Sequences of instructions comprised by the operating system are then executed by processor 1507 to load other computer programs and portions of computer programs into system memory from non-volatile storage. The present invention may be embodied in a sequence of instructions which can be stored in a computer-readable medium and executed by processor 1507. It will be appreciated that both system memory and nonvolatile storage may be used to effectuate a virtual memory. In that case, sequences of instructions defining a portion of the operating system or an application program may be kept in non-volatile storage and then moved to system memory when required for execution.

Having described a method for practicing the present invention, it should be noted that the individual steps therein may be performed by a general purpose processor programmed with instructions that cause the processor to perform the recited steps, specific hardware components that contain hard-wired logic for performing the recited steps, or any combination of programmed general purpose computer components and custom hardware components. Nothing disclosed herein should be construed as limiting the present invention to a single embodiment wherein the recited steps are performed by a specific combination of hardware components.

INDUSTRIAL APPLICABILITY

The described method for compensatory ratio hedging provides a highly effective and dynamic manner for mismatched maturity hedging so as to curtail the serious financial reporting implications of Financial Accounting Standards No. 133 ("FAS 133") of the Financial Accounting Standards Board for business entities that seek to qualify for special hedge accounting by categorizing swaps as "fair value hedges." Preferably, business entities that use the present invention use a shorter maturity swap to hedge a longer maturity bond and, for purposes of FAS 133, are hedging all of the bond's remaining life or maturity but, because a hedge expires when the swap expires, only for the swap's life span. The disclosed methodology permits users to avoid the serious reporting implications of FAS 133 by satisfying the primary requirements of the swap being highly effective and the swap MTM closely correlating with or matching the bond's MTM.

While certain features of the invention have been illustrated as described herein, many modifications, substitutions, changes and equivalents will now occur to those skilled in the art. For example, an embodiment in accordance with the invention may be implemented with any computer system or electronic device, as previously described. It is, therefore, to be understood that the appended claims are intended to cover all such modifications and changes as fall within the true spirit of the invention.

The invention claimed is:

1. A computer implemented method of compensatory ratio hedging, comprising:
   determining a plurality of periods of time making up a life of a swap; and
   hedging an amount of a bond by said swap, said bond having a different maturity from said swap, wherein said amount of said bond hedged by said swap varies during the life of said swap to change similarly said swap mark-to-market value to said bond mark-to-market value by varying a compensatory hedge ratio of bond being hedged to said swap in each determined period of time to compensate for differences in said swap mark-to-market value and said bond mark-to-market value.

2. The method of claim 1 wherein an interest rate change has a similar dollar impact on said swap mark-to-market value and said bond mark-to-market value.

3. The method of claim 1 wherein maturity of said swap and said bond are closely matched.

4. The method of claim 1 wherein a lesser said amount of said bond is said hedged by said swap when said bond maturity is longer.

5. The method of claim 1 wherein said ratio of said bond being said hedged to said swap varies to maintain similar amounts of dollar value volatility as the maturity ratio of said bond to said swap changes.

6. A computer-readable medium having computer-executable instructions for performing the computer-implemented method recited in claim 1.

7. A computer programmed to execute compensatory ratio hedging, the computer having the program performing the computer-implemented method recited in claim 1.

8. A computer implemented method for obtaining a compensatory hedge ratio, comprising:
   identifying a bond being hedged by a swap;
   determining the amount of said swap being issued and using same said amount for said bond;
   determining a plurality of periods of time making up a life of said swap maturity; for each period of time in the plurality of periods of time,
   calculating a present value of a one basis point change in said swap yield;
   calculating a present value of a one basis point change in said bond yield; and varying the amount of said bond being hedged by said swap by varying said compensatory hedge ratio over the plurality of periods of time;
   calculating the compensatory hedge ratio by dividing (i) said present value of a one basis point change in said swap yield by (ii) said present value of a one basis point change in said bond yield.

9. The method of claim 8 wherein said compensatory hedge ratio is computed for each period of time of said swap maturity schedule, thereby varying said compensatory hedge ratio throughout the term of said swap and between different swaps to account for unique properties of said bond and said swap.

10. The method of claim 8 wherein said determining a period of time of said swap maturity includes utilization of a hypothetical period.

11. A computer-readable medium having computer-executable instructions for performing the computer-implemented method recited in claim 8.

12. A computer programmed to execute a compensatory hedge ratio, the computer having the program performing the computer-implemented method recited in claim 8.

13. A computer implemented method for determining ineffectiveness using a compensatory hedge ratio, comprising:
   (A) identifying a bond being hedged by a swap;
   (B) determining the amount of said swap being issued and using same said amount for said bond;
   (C) determining a period of time of said swap maturity;
   (D) calculating a present, value of a oasis point change in said swap yield by:
      (1) determining a projected profit of said swap for a predetermined period of time by calculating the difference between (i) said predetermined period of time commercial paper interest rate and (ii) said swap fixed interest rate,
      (2) computing a present value of step (D)(1) using said swap fixed interest rate as a discount rate,
      (3) determining a projected profit of said swap for said predetermined period of time by calculating the difference between (i) said predetermined period of time commercial paper interest rate plus one basis point and (ii) said swap fixed interest rate,
      (4) computing a present value of step (D)(3) using said swap fixed interest rate as a discount rate,
      (5) computing said present value of said basis point change in said swap yield by calculating the difference between step (D)(4) and step (D)(2);
   (E) calculating a present value of a basis point change in said bond yield;
      (1) determining a period of time remaining in said bond maturity,
      (2) computing a present value of future interest and principal payments of said bond using an initial current yield to maturity as said discount rate,
      (3) computing a present value of said future interest and said principal payments of said bond using a sum of (i) said initial current yield to maturity and (ii) said basis point as said discount rate,
      (4) computing said present value of said basis point change in said bond yield by calculating the difference between step (E)(3) and step (E)(2);
   (F) calculating said compensatory hedge ratio in said predetermined period of time by dividing step (D)(5) by step (E)(4) and
   (G) determining said ineffectiveness in said predetermined period of time by calculating the difference between (i) said bond mark-to-market change in said predetermined period of time, and (ii) said swap mark-to-market change in said predetermined period of time.

14. The method of claim 13 further comprising:
   determining the effectiveness between said bond mark-to-market change in said predetermined period of time and said swap mark-to-market change in said predetermined period of time by calculating the difference between one and the division of (i) the sum of said predetermined period of time square of ineffectiveness by (ii) the square of total deviation.

15. The method of claim 13 wherein step (C) includes utilization of a hypothetical period.

16. A computer-readable medium having computer-executable instructions for performing the computer-implemented method recited in claim 13.

17. A computer programmed to execute ineffectiveness using a compensatory hedge ratio, the computer having the program performing the computer-implemented method recited in claim 13.

* * * * *

UNITED STATES PATENT AND TRADEMARK OFFICE
CERTIFICATE OF CORRECTION

PATENT NO. : 7,499,881 B2 Page 1 of 1
APPLICATION NO. : 09/738618
DATED : March 3, 2009
INVENTOR(S) : Mark A. Henninger It is certified that error appears in the above-identified patent and that said Letters Patent is hereby corrected as shown below:

Column 9, line 52, delete "swap at" and insert -- swap – at --.

Column 10, line 64, delete "ineffectivenessresults" and insert -- ineffectiveness results --.

Column 13, line 14, in claim 1, before "bond" insert -- said --.

Column 13, lines 46–48, in claim 8, after "yield" delete "; and varying the amount of said bond being hedged by said swap by varying said compensatory hedge ratio over the plurality of periods of time".

Column 13, line 52, in claim 8, after "yield" delete "." and insert -- ; and varying the amount of said bond being hedged by said swap by varying said compensatory hedge ratio over the plurality of periods of time. --.

Signed and Sealed this

Fourteenth Day of July, 2009

JOHN DOLL
*Acting Director of the United States Patent and Trademark Office*